(12) United States Patent
Kostrzewski et al.

(10) Patent No.: US 8,879,410 B1
(45) Date of Patent: Nov. 4, 2014

(54) PLATFORM ADAPTIVE DATA SYSTEM

(75) Inventors: Andrew Kostrzewski, Garden Grove, CA (US); Sookwang Ro, Glendale, CA (US); Kang Lee, Woodland Hills, CA (US); Thomas Forrester, Hacienda Heights, CA (US); Michael Alan Thompson, Hawthorne, CA (US); Tomasz Jannson, Torrance, CA (US)

(73) Assignee: Physical Optics Corporation, Torrance, CA (US)

( * ) Notice: Subject to any disclaimer, the term of this patent is extended or adjusted under 35 U.S.C. 154(b) by 137 days.

(21) Appl. No.: 13/290,987

(22) Filed: Nov. 7, 2011

Related U.S. Application Data

(60) Provisional application No. 61/541,885, filed on Sep. 30, 2011, provisional application No. 61/547,612, filed on Oct. 14, 2011.

(51) Int. Cl.
| | |
|---|---|
| *H04L 12/26* | (2006.01) |
| *H04L 12/28* | (2006.01) |
| *H04Q 11/00* | (2006.01) |
| *H04Q 3/00* | (2006.01) |
| *G05B 23/02* | (2006.01) |
| *G06F 15/16* | (2006.01) |
| *G01S 19/18* | (2010.01) |

(52) U.S. Cl.
USPC ........... 370/252; 370/254; 370/360; 370/386; 340/2.2; 340/3.1; 709/249; 342/357.56

(58) Field of Classification Search
USPC ......... 370/388, 389, 392, 230, 232, 468, 248, 370/252, 254, 360, 386; 709/221, 249; 340/2.2, 3.1; 342/357.56
See application file for complete search history.

(56) References Cited

U.S. PATENT DOCUMENTS

| | | | | |
|---|---|---|---|---|
| 6,118,791 | A * | 9/2000 | Fichou et al. | 370/468 |
| 6,989,797 | B2 * | 1/2006 | Gothard et al. | 343/834 |
| 7,336,605 | B2 * | 2/2008 | Bruckman et al. | 370/230 |
| 7,630,390 | B2 * | 12/2009 | Zumsteg et al. | 370/425 |
| 7,920,472 | B2 * | 4/2011 | Porat | 370/232 |
| 7,958,209 | B2 * | 6/2011 | Gous et al. | 709/221 |
| 8,315,630 | B2 * | 11/2012 | Zinser et al. | 455/436 |
| 8,521,479 | B2 * | 8/2013 | Musharbash | 703/1 |
| 8,645,574 | B2 * | 2/2014 | Kaila et al. | 709/248 |
| 2008/0267076 | A1 * | 10/2008 | Laperi et al. | 370/242 |

* cited by examiner

*Primary Examiner* — Alpus H Hsu
*Assistant Examiner* — Anthony Luo
(74) *Attorney, Agent, or Firm* — Sheppard Mullin Richter & Hampton LLP

(57) ABSTRACT

Some embodiments of the invention relate to WRAs that implement removable memory units (RMUs). The ability to load operational, maintenance, and mission data through RMUs is critical for avionics platform safety and logistics. However, due to strong hardware dependence, universality, or rather platform-invariance is not currently available for aircraft data acquisition (including the real-time recording of new performance, operational (flight) and environmental data) or mission data loading via prior art WRAs.

27 Claims, 28 Drawing Sheets

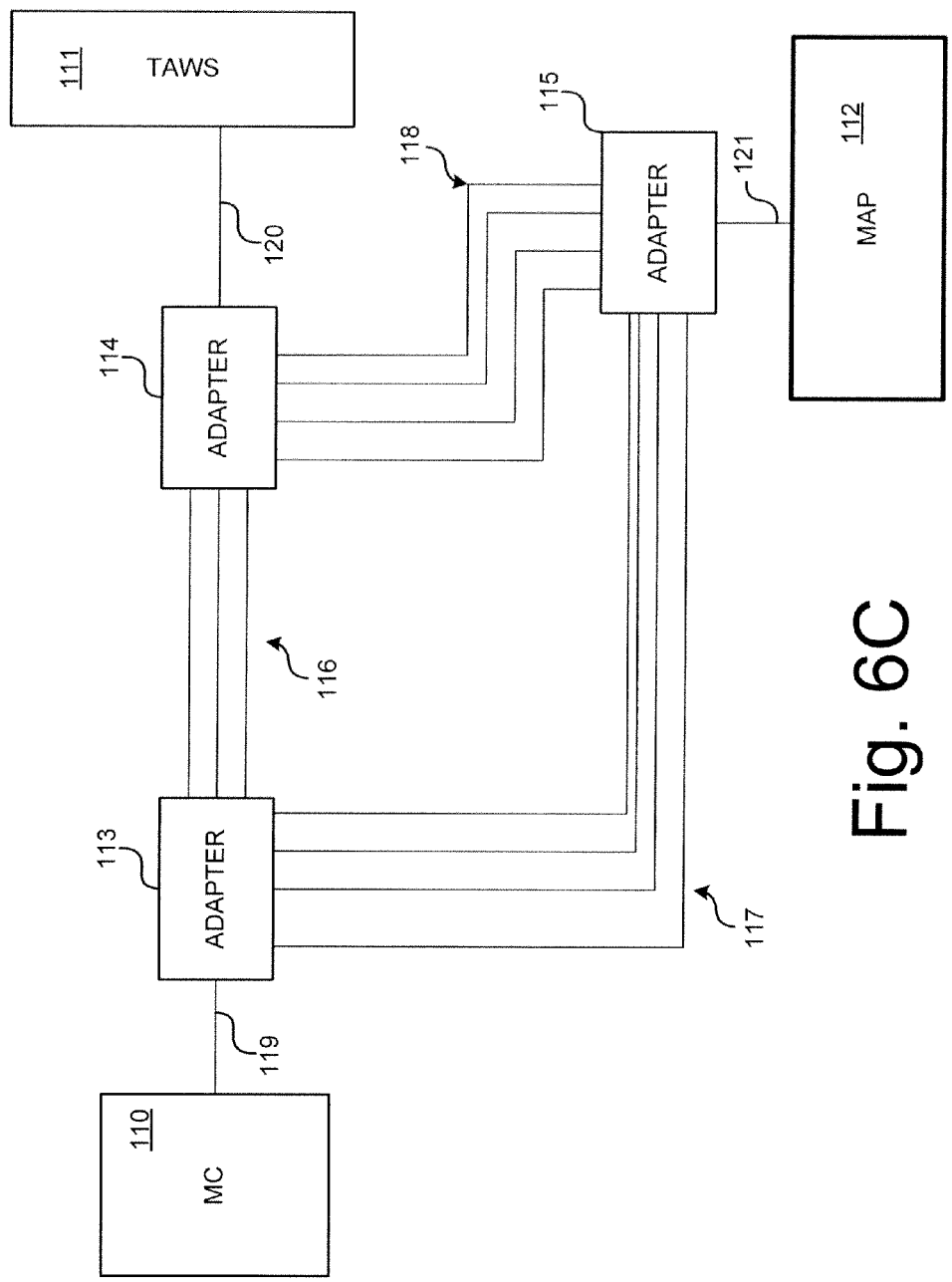

Interconnectivity Matrix for Flight Data Recorder (FDR)

| Source WRA | Destination WRA | Bandwidth | Number of segments | Segment Length | Attenuation @ | BER | Impedance | Gage | Shielding/ Twisted pair | VSWR |
|---|---|---|---|---|---|---|---|---|---|---|
| FDR – D1 | MC – C23 | 150 MHz | 3 | 5', 3', 7' | 3dB | 10-7 | 50Ω | 26 | n/n | NA |
| DFR – D2 | DAU – A10 | 80 MHz | 2 | 10', 3' | 2 dB | 10-6 | 50Ω | 22 | n/y | NA |
| DFR – D3 | DAU – A11 | 80 MHz | 2 | 10', 3' | 2dB | 10-6 | 50Ω | 22 | n/y | NA |
| DFR – D4 | MDL – A5 | 100MHz | 2 | 5', 6' | 1.5dB | 10-8 | 50Ω | 22 | n/n | NA |
| . |  |  |  |  |  |  |  |  |  |  |
| . |  |  |  |  |  |  |  |  |  |  |

FDR – Flight Data Recorder, D1 – Connector D, Pin 1

MC – Mission computer, C23 – connector c pin 23

DAU – Data Acquisition Unit, A10 – connector A, pin 10

MDL – Mission Data Loader, A5 – connector a, pin 5

Fig. 6D

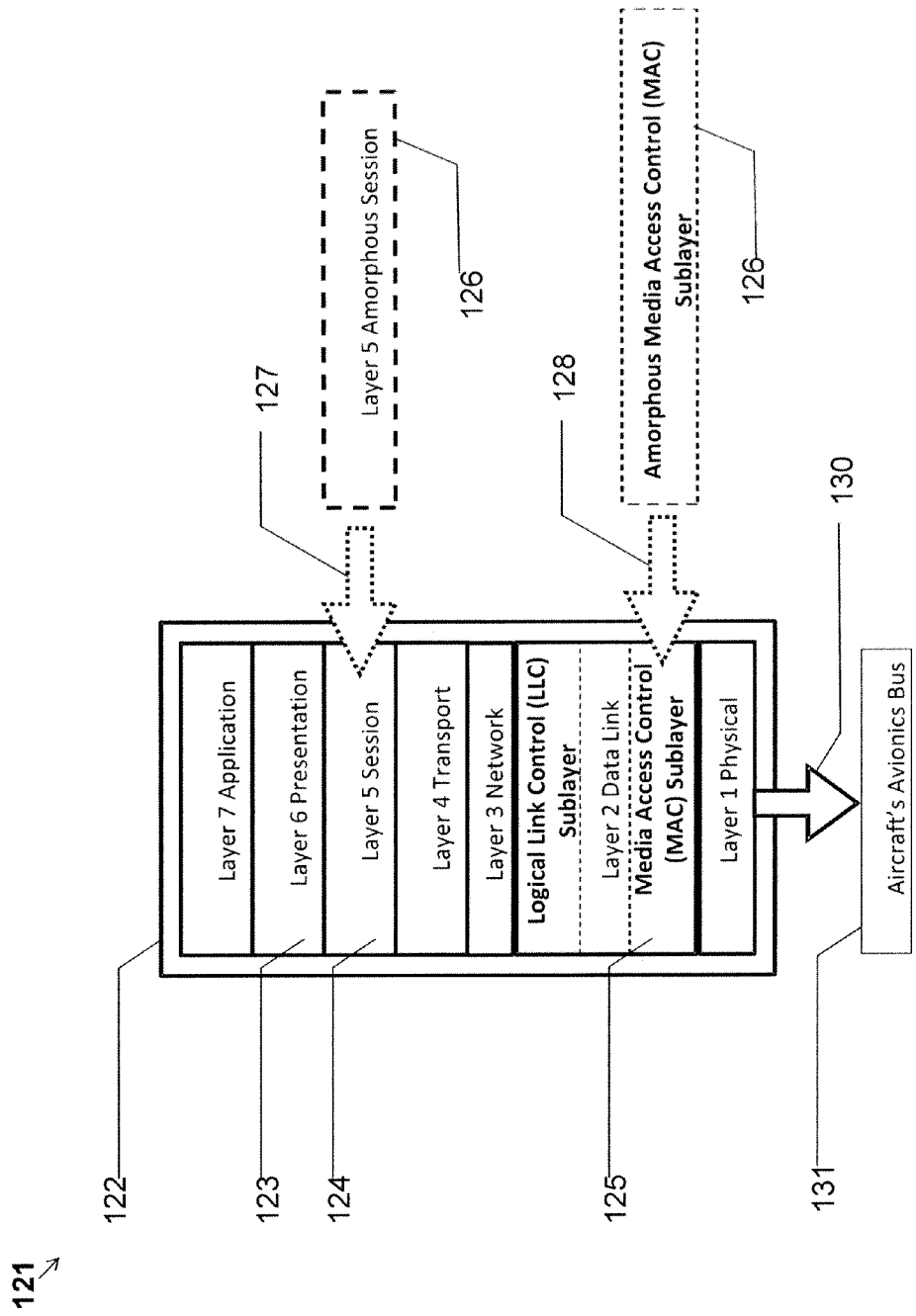

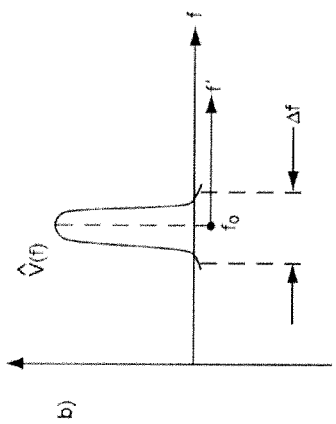
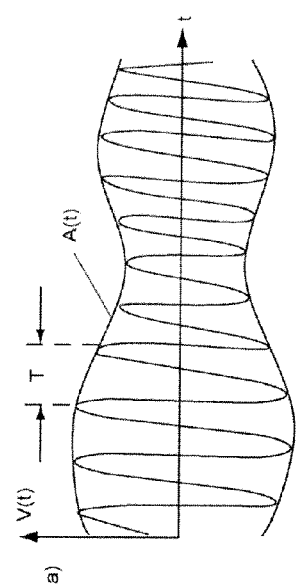
Fig. 16B

PLATFORM ADAPTIVE DATA SYSTEM

CROSS-REFERENCE TO RELATED APPLICATIONS

This application claims the benefit of U.S. Provisional Application No. 61/541,885, filed Sep. 30, 2011, and also claims the benefit of U.S. Provisional Application No. 61/547,612, filed Oct. 14, 2011.

TECHNICAL FIELD

The present invention relates generally to replaceable units for communication platforms, and more particularly, some embodiments relate to retrofitting pre-existing low-speed communications platforms to enable high-speed communications between line replaceable units.

DESCRIPTION OF THE RELATED ART

A "family-of-systems" (FoS) is a set or arrangement of independent (not interdependent) systems that can be arranged or interconnected in various ways to provide different capabilities. The mix of systems can be tailored to provide desired capabilities dependent on the situation. Interoperability of the independent platforms is a key consideration in the ad hoc deployment of a "family-of-systems." Examples of platforms in which FoSs operate include aircraft and avionics systems, ground platforms (vehicles), space platforms, marine platforms, sensor platforms, and other manned or unmanned platforms. Unmanned platforms include UAVs (Unmanned Aerial Vehicles), UGVs (Unmanned Ground Vehicles), and others.

Platforms often utilize various replaceable units. These replaceable units are sometimes called "line-replaceable units" (LRU), which are modular components of an airplane, or other platform, and that are designed to be replaced quickly at an operating location. When implemented in a warfighter weapons system, the term weapons replaceable assembly (WRA) is often used to refer to replaceable units, especially in reference to Navy platforms. However, as used herein, the term WRA will be used to refer to any replaceable modular component of a platform, whether or not it is used in a weapons system. Accordingly, typical WRAs include Flight Data Recorders (FDR), Removable Memory Units (RMU), Terrain Awareness Avoidance Units (TAWS), Mission Data Loaders (MDL), Data Loaders (DL), Data Recorders (DR), Audio/Video Recorders (AVR), Data Transfer Units (DTU), Data Transfer Devices (DTD), map storage devices, collision avoidance systems, crash survivable data recorders, and many others. The above WRAs create a non-exclusive, non-complete and possibly-overlapping set, and are given simply for reference.

Modern WRAs often require reconfigurability and high speed interfaces that are not available on typical existing platforms. For example, a modern WRA may require high speed data interfaces for such intra-avionics equipment communications, such as, Gigabit Ethernet or GbE (IEEE 802.3), Firewire (IEEE 1394), and Fibre Channel, as well as inter-avionics (external) data interfaces to download and upload such as: USB 2.0, USB 3.0, eSATA, Firewire (IEEE 1394), high speed wireless interfaces (such as WiFi IEEE 802.11n), and others. Implementing these high-speed interfaces typically requires overhauling the platforms existing wiring, which is often a complex and difficult task. Additionally, overhauling the wiring requires upgrading all existing systems on the platform to communicate using the new. Accordingly, often overhauling is performed by adding new wiring and communication systems without removal of old systems. However, this causes problems such as increasing wiring complexity, weight, and decreasing reliability.

Additionally, in some applications WRAs must provide information assurance (IA) capabilities in such a way that sensitive, or confidential data is secured according to various security standards such as FIPS 140-2 standards, NSA Type 1, or Suite B security for sensitive and diversified data management and handling. Typical pre-existing platforms are not equipped to provide secure data handling and information assurance. Additionally, adequate security key management is often required for classified and un-classified (secret, top secret, etc.) data, where the security keys include encryption keys and Cipher Injection Keys (CIK) for both key management and handling. Generally, data types are divided according to RED and BLACK classifications, with data in each class treated differently. However, different parties use slightly different definitions for RED and BLACK data, for example the CNSSI 4009 glossary and NACSIM 5000 (TEMPEST) glossary have slightly varying definitions, both of which are incorporated by reference in their entireties. As used herein, RED and BLACK refers to the CNSSI 4009 glossary definition, except where departures from the definition are evident from the text.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 6A-6D illustrate interconnectivity between a PADS system and a preexisting platform.

FIG. 7 illustrates a modified communications stack for use in communications between a PADS system and a preexisting platform.

FIGS. 16A-D provides a method for electronically verifying proper mechanical mating of electrical connectors by sensing a characteristic vibrational signal created when connectors properly mate.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a platform-invariant ground/avionics manned/unmanned data/event transfer/storage/evaluation system and device, or, shortly, a platform-adaptive data system (PADS). The PADS is Family of Systems (FOS) that includes reconfigurable set of so-called Weapons Replaceable Assemblies (WRAs) which provide data transfer, loading and storage (recording) capabilities for aircraft platforms. In particular embodiments, these systems are used in retrofitting preexisting platforms while reducing or eliminating the need to overhaul the platforms' existing wiring.

Some embodiments of the invention relate to WRAs that implement removable memory units (RMUs). The ability to load operational, maintenance, and mission data through RMUs is critical for avionics platform safety and logistics. However, due to strong hardware dependence, universality, or rather platform-invariance is not currently available for aircraft data acquisition (including the real-time recording of new performance, operational (flight) and environmental data) or mission data loading via prior art WRAs. Universality, or platform-invariance, refers the ability of a singular avionics unit, or WRA, such as flight data recorder (FDR), or mission data loader (MDL), to be installed and made functional on multiple aircraft platforms—both fixed and rotary-wing. However, these considerations also apply to ground, space, and other on the move (OTM) platforms. Specifically, prior art avionics units are either communication bus-dependent, or hardware/platform dependent, or both. In this section, the OSI system is applied, for sake of explanation.

Figure 1:
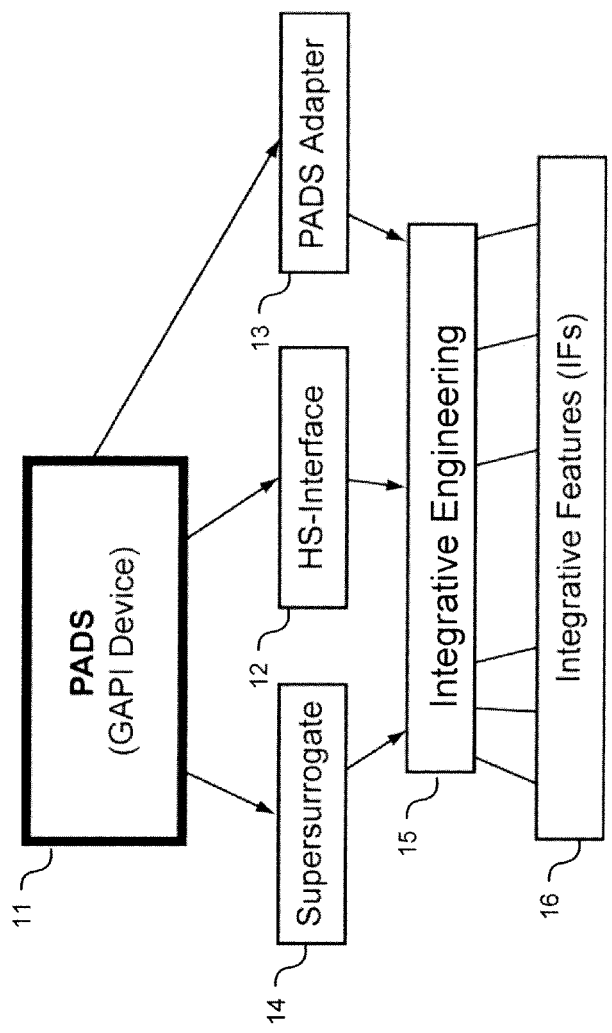
FIG. 1 illustrates a conceptual architecture for various embodiments of PADS devices.

Embodiments of the invention are related to providing adequate PADS platform invariance, to allow development of specific modules for integration with preexisting platforms. This feature is called ground/avionics-platform-invariance (GAPI). FIG. 1 illustrates a conceptual architecture for various embodiments of PADS devices. Here, the PADS, or GAPI device 11 has three architectural aspects. These aspects allow assembly of different modules that can integrated, or retrofitted, in preexisting platforms without significantly overhauling the preexisting platforms' communication systems.

First, the PADS 11 concept comprises a supersurrogate set of modules 14. The supersurrogate set 14 is a set of "stock" or generic modules, with integrative hardware, software, and firmware. The supersurrogate set 14 can be implemented by selecting a subset of the supersurrogate set 14 to produce a physical module. In other words, stock modules from this set may be implemented together to form a specific surrogate module for integration with a platform. In some embodiments, the stock modules are designed to be cost optimized and substantially similar for all platforms of interest. To enable this design, the PADS topology (internal bus, OS, and communications protocols) is homogenized across platforms. This allows the PADS supersurrogate modules 14 to be customized for a specific platform application without substantial modification of core system components. To assist the customization, implementation of the supersurrogate modules 14 may be equipped with various external capabilities, such as OFP (operational flight program) data mining and platform-sniffing capabilities.

The PADS concept 11 further comprises a high-speed interface 12. The high speed interface 12 provides a communications between modules that make up an implementation of the supersurrogate set 14. The interface 12 additional provides a communication link to other platform systems.

An adapter module 13 couples the interface 12 to the platform. Accordingly, integration of the adapter 13, the interface 12, and an implementation of the supersurrogate set 14 provide a platform-specific GAPI device. Adapter 13 provides an adequate architecture for allowing the PADS device 11 to function as an WRA in the platform of interest. This includes adaptation of adequate interface 12 and required WRAs into available space and wiring provided by the platform of interest.

In some embodiments, the adapter module 13 avionics interfaces resides at Open System Interconnect (OSI) Layers 1 (Physical) and 2 (Data Link) and can be reconfigured modularly to allow data to be moved upstream (i.e., to Layers 3 through 7) from sensors (e.g., cameras, microphones, thermocouples, pitot tubes, engine probes, etc.) located at Layer 1 in an aircraft (i.e., platform), regardless of said platform specifics for onboard recording and optional processing. Secondly, the main communication bus, or avionics bus, interface can be reconfigured as desired to support any aircraft platform without re-design or additional nonrecurring engineering (NRE) of the present invention's main, or stock, unit 14. These two aspects of the present invention, along with others, provide universality, or platform-invariance.

In embodiments implementing the PADS concept 11, an implementation of the supersurrogate set 14 is combined with a high-speed interface 12, and a PADS adapter 13 in an integrative engineering approach 15. The integrative engineering 15 allows the implementation to be integrated into a platform without extensive overhauls. Additionally, various integrative features 16 may be engineered 15 into various PADS modules. Some or all of these features 16 may be implemented in various embodiments of the invention, and are discussed further below. Further information regarding integrative engineering may be found at Tomasz Jannson and Andrew Kostrzewski, "From Fourier optics to integrative engineering," SPIE Prods 8122-20 (August, 2011), the contents of which are hereby incorporated by reference in their entirety.

Figure 2:
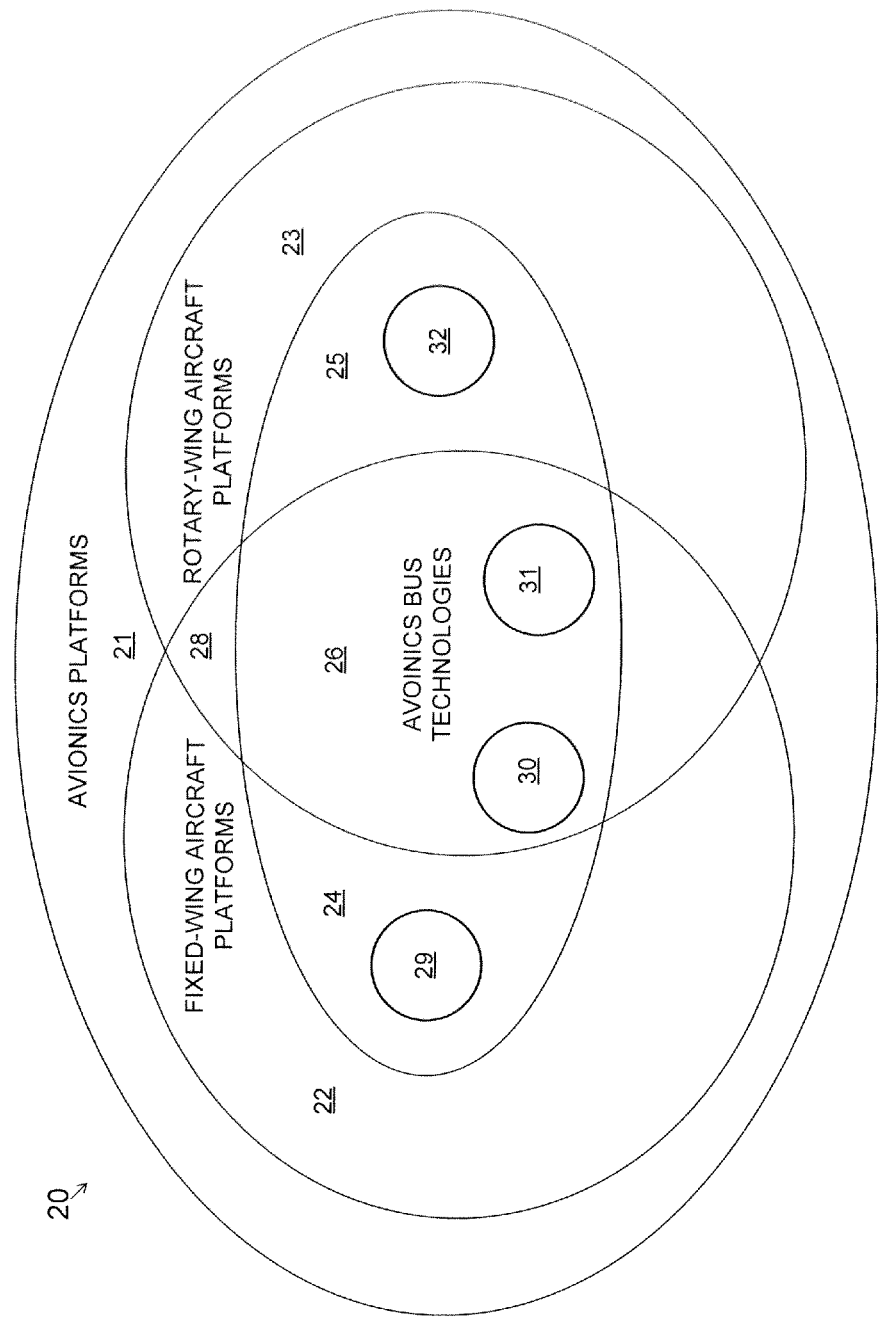
FIG. 2 is a Venn diagram illustrating aspects of various aircraft platforms in which embodiments of the invention may be implemented.

FIG. 2 is a Venn diagram 20 illustrating aspects of various aircraft platforms in which embodiments of the invention may be implemented. The illustrated aircraft platforms (either manned or unmanned) 21, include fixed-wing aircraft (airplanes) 22 and rotary-wing aircraft (helicopters) 23 share some features 28. These shared features 28 include engines and engine-monitoring systems, including avionics bus topologies 26 which are shared across platform with their interconnect functionality provided at OSI Layers 1 and 2.

However, not all aircraft platforms share a specific type of common avionics bus. Rather, there are many different types of aircraft bus topologies 26. Frequently, avionics bus topologies 26 are not shared between fixed-wing platforms 24 and rotary-wing platforms 25. Taking different fixed-wing aircraft, there are a myriad of different avionics bus technologies, such as 1553-bus 29, RS-232 30, IEEE 802.3 (Ethernet) 31, and IEEE 1394 (Firewire) 32, amongst others. The same is true for rotary wing aircraft. Embodiments of the present invention enable extension of the small area of natural overlap 26 where commonality exists in state of the art (SoA) platforms to encompass all manner of aircraft platforms, effectively merging regions 24, 25, and 28 in order to provide for true platform-invariance, or avionics system universality. Although illustrated in terms of avionics platforms 21, these considerations apply equally to other types of platforms, such as ground vehicle platforms or sensor platforms.

Figure 3:
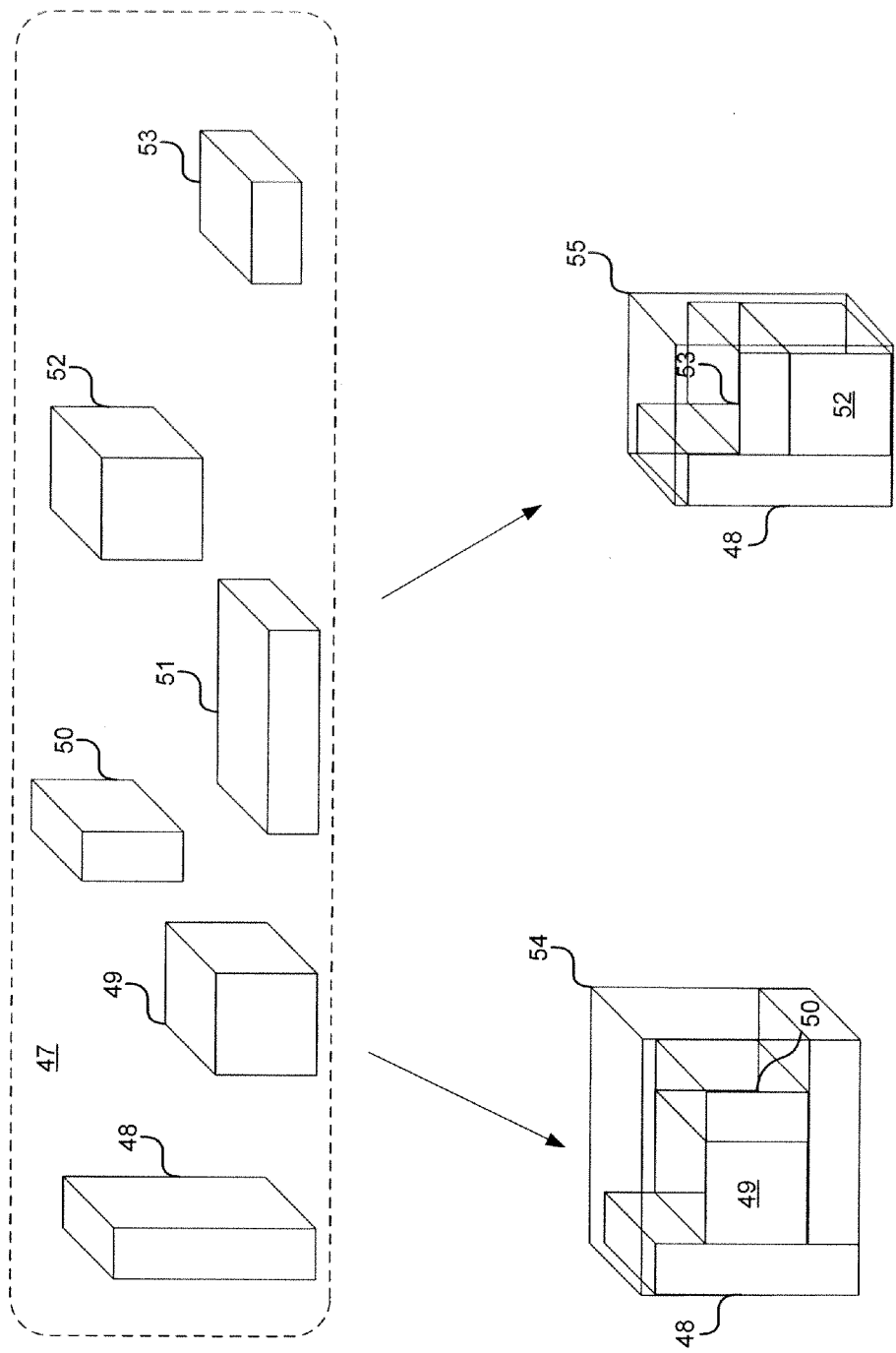
FIG. 3 illustrates a supersurrogate set of modules and various replaceable units implementing the supersurrogate set.

FIG. 3 illustrates use of a PADS supersurrogate set 47 to implement different supersurrogate modules 54 and 55. As described above, embodiments of the invention integrate items from a set of modules, termed a supersurrogate set, into different physical modules. These physical modules may then be integrated into preexisting or newly developed platforms. Examples of such modules include various common features in avionics, ground, or sensor platforms. For example, the modules might include a first interface module 48, a second interface module 49, a map data system 50, a data recorder 52, or various sensors 53, among other functional modules.

In different implementations, the modules may be combined for form WRAs 54 and 55. For example, the first WRA 54 be a mission data loader (MDL) which includes RMUs providing maintenance data and map data. The second WRA 55 may comprise a digital video/voice recorder and crash-survivable memory unit. In some embodiments, the WRA 55 may have either ED-112, or ED-155 compliance (ED-112 has much higher: impact, temperature and deep water test compliance than ED-155). In a particular embodiment, the WRA 71 has at least 128 GB of crash survivable memory.

In further embodiments, the WRAs may be physically combined themselves to form various assemblies, for example, resembling LEGO® toy blocks. For example, combined with a graphics processor, modules 54 and 55 may be combined to form a Data Locker Device and Digital Video/Voice Recorder with Crash Survivable Unit and graphics card. In a particular embodiment, such a PADS configuration is able supporting digital terrain elevation data (DTED) Level 2 to support Terrain Avoidance Warning Systems (TAWS), for example.

A major cost and complexity of new avionic hardware installation is in rewiring the existing platform to support new hardware (Weapon Replicable Array (WRA)) features like higher interconnectivity speed, use of new faster data transfer protocols, serialization of data, etc. Generally, the existing avionic platforms offer large number of internal connections with support for lower data rates that are needed for new hardware installation. Embodiments of the invention provide reusability and reassignment of existing internal connections. In some embodiments, several connections are bundled together to support higher aggregate bandwidth to meet the increased data rare requirements. In some embodiments, integrating a platform invariant unit (PADS supersurrogate) into a particular platform includes a discovery stage where the exiting platform interconnectivity topology is discovered, followed by a mapping stage where the WRA high-speed data rates connections are mapped into a larger number of slower data rate connections. In particular embodiments, the first stage is executed using a laboratory test equipment and the second stage will be executed by the Operational Flight Program (OFP) residing in the WRA.

Figure 4:
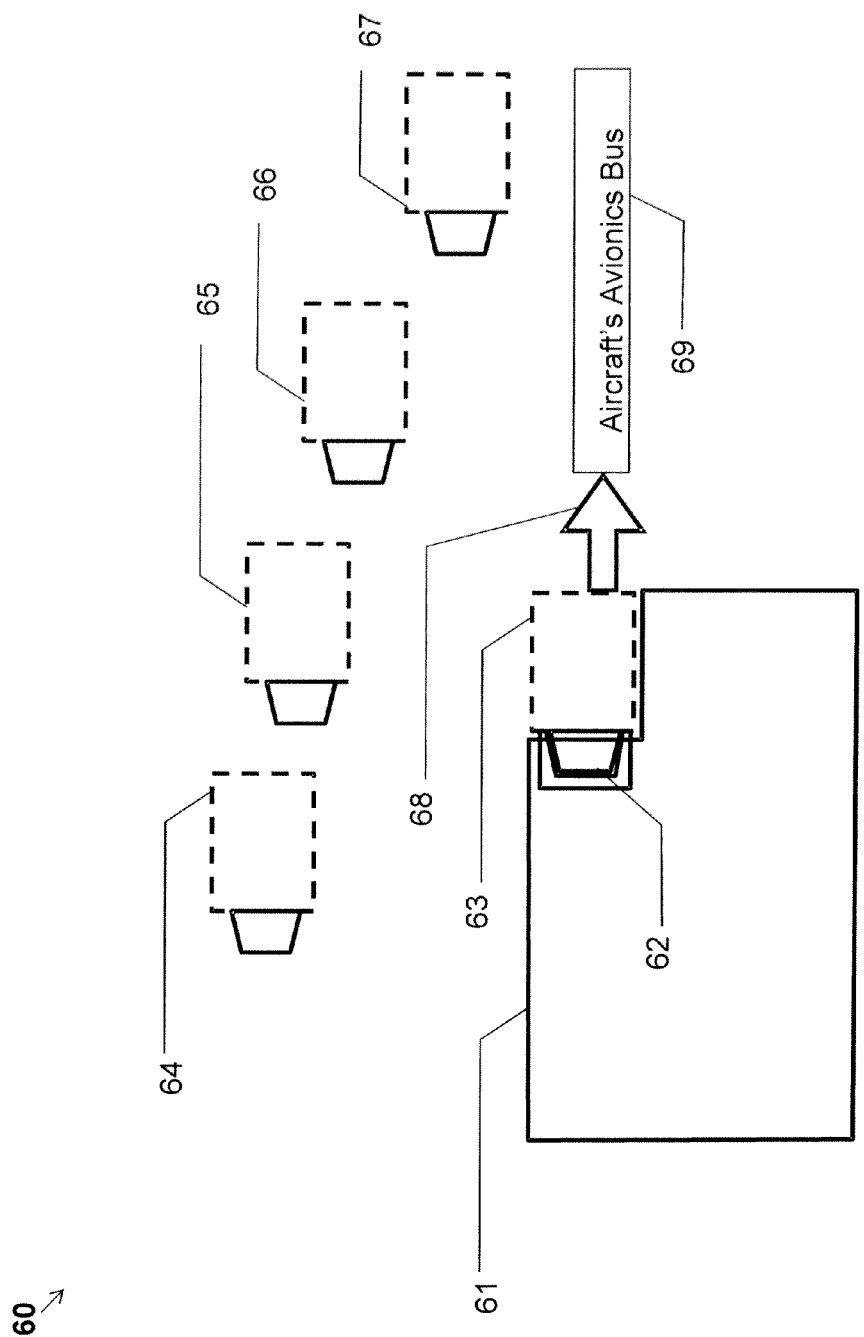
FIG. 4 illustrates a platform invariant unit implemented in accordance with an embodiment of the invention.

FIG. 4 illustrates a platform invariant unit implemented in accordance with an embodiment of the invention. In this embodiment, the platform invariant unit 60 comprises a stock or supersurrogate base unit 61. As illustrated with respect to FIG. 3, the base unit 61 may itself comprise a variety of modules from a supersurrogate set of functional modules. Additionally, the supersurrogate base unit 61 comprises an interface module 62 that is configured to provide an electronic communications interface between the module 61 and a specific external platform. Adapter modules, such as adapter modules 63, 64, 65, 66, or 67 are used to connect 68 the wires of the platform bus 69 to the supersurrogate base unit 61. In some embodiments, the entire assembly 60 may comprise a LRU or WRA, while in other embodiments, the adapters themselves may be replaced on site, and comprise LRUs or WRAs themselves. Various adapters may be provided for varying bus standards, for example 1553-bus 44, RS-232 45, IEEE 802.3 (Ethernet) 46, and IEEE 1394 (Firewire) 47, amongst others at the aircraft's avionics bus 49 OSI Layer 1 interface.

Figure 5:
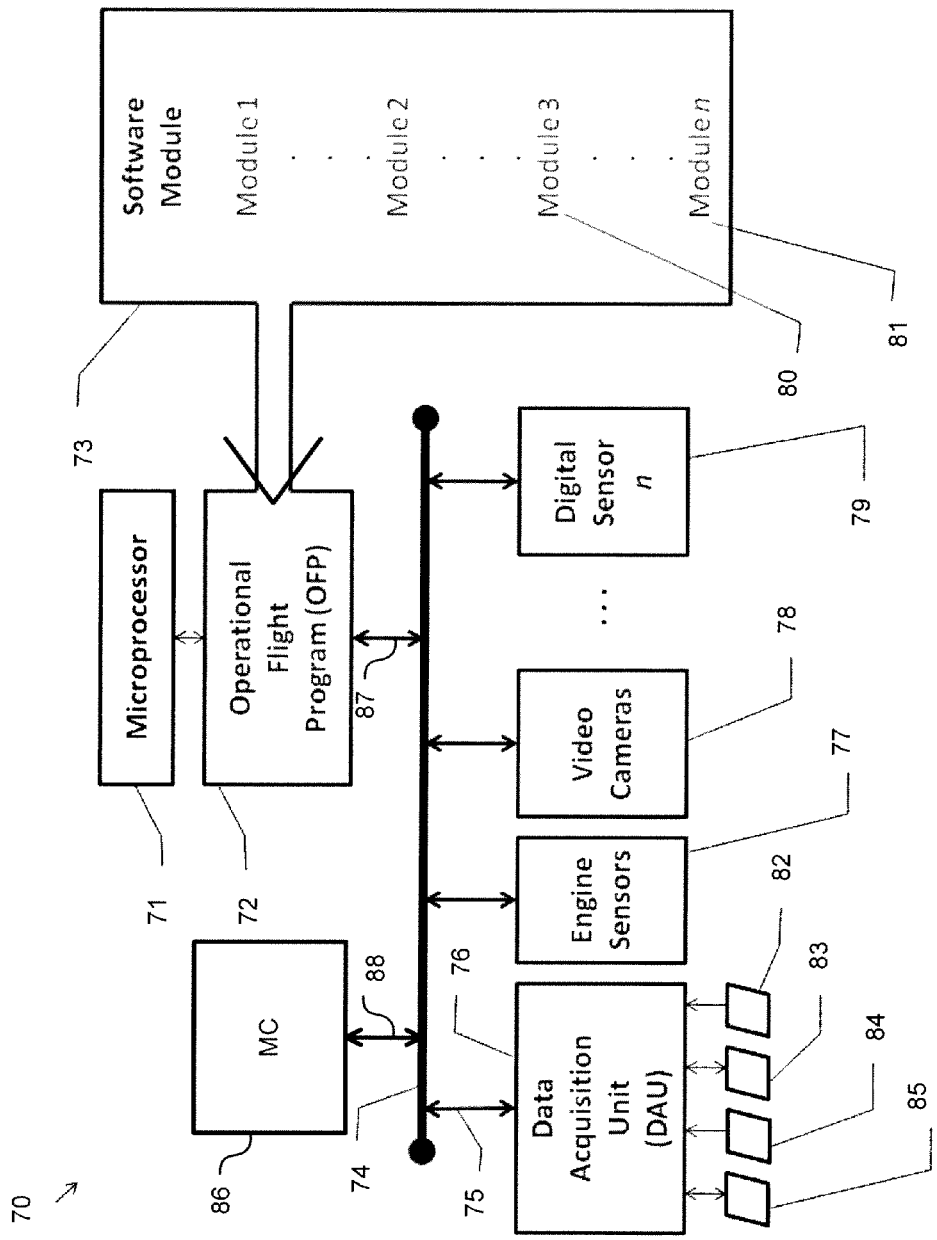
FIG. 5 illustrates a PADS system implemented in accordance with an embodiment of the invention.

FIG. 5 illustrates a PADS hardware and software architecture implemented in accordance with an embodiment of the invention. In this embodiment, the architecture 70 includes a microprocessor 71. The microprocessor 71 executes an operational flight program (OFP) 72. The OFP includes a plurality of software modules 73. Various different modules 81, 80 may be provided in different OFP implementations. In addition to implementing the functionality of the specific PADS application, the software modules 73 include software configured to adapt the PADS to the application platform. For example, the software modules 73 include modules executing the data distribution, to distribute the PADS 70 I/O connectivity 87 to a bus 74. As discussed below, this connectivity 87 may be implemented by control of a crossbar switch configured to implement a bus topology on a preexisting wiring platform. Additionally, the software modules 73 may be implemented in the amorphous layer 5 and 2 protocols discussed below.

The illustrated architecture further includes a bus 74 onto which the OFP 72 communicates. Connected to the OFP 71 through the bus, is a data acquisition unit 75 and a plurality of sensors. For example, the sensors may include engine sensors 97, video cameras 98, and digital sensors 99. The data acquisition unit 96 provides data from a plurality of analog sensors, 102, 013, 104, and 105. For example, such sensors might include pressure sensors, temperatures sensors, altitude sensors, and wind speed sensors. In additional embodiments, some of the functionalities of these or other sensors may be incorporated into OFP 72.

Frequently, a mission computer (MC) 86 will be coupled to bus 74 to communicate with OFP 72. The MC is configured to receive reports from sensors, such as analog sensors from DAU 75 and the digital sensors 79. Additionally, the OFP 72 may be configured to report information to the MC 86. The MC 86 may also be configured to issues warnings or command signals to the other devices on bus 74, such as OFP 72. For example, the OFP may be a TAWS configured to collect data from the sensors and issue reports to the MC if terrain conditions indicate. The MC may then issue warnings to other system or to the operator of the platform.

Figure 6A:
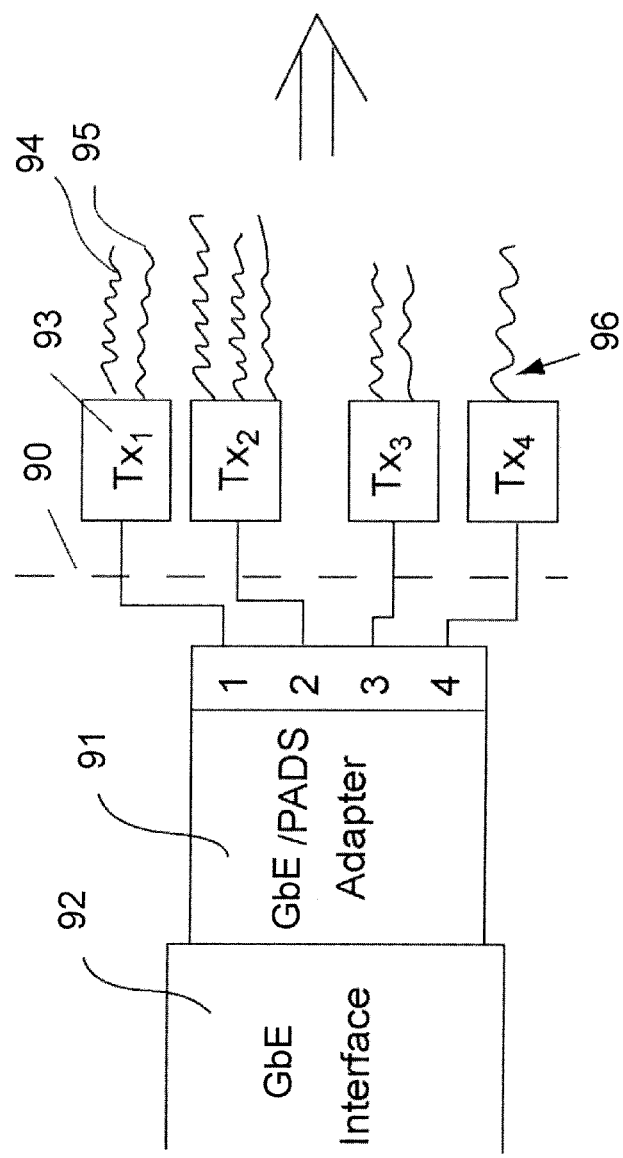

In some embodiments, the interface for a PADS implementation to other platform systems (such as other PADS implementations) may be by way of a high-speed communications interface. For example, the high-speed interface may be a Gigabit Ethernet connection (GbE). High-speed interfaces such as GbE usually do not exist in prior art platforms. The challenge is to use preexisting wiring in order to create relevant GBE interface, or other high-speed interface, without replacing, if possible, the preexisting wiring. FIG. 6A illustrates a general system for adapting a high-speed interface to preexisting wiring. FIG. 6A shows only one side of the system; an equivalent system is provided on the other side of a communication link.

FIG. 6A uses a GbE system built of four (4) twisted pairs, each with 250 Mbps, or 250 Mbs speed, totally with 1 Gbs-speed, as an example. The example preexisting wiring is assumed to be only low-speed. In 6A, broken line 90 is a border line illustrating the interface between the adapter embodiment 91 and the prexisting wiring to the right of the border. The GbE interface 92 is coupled to an adapter 91. The Tx/Rx—93 comprises a physical layer producing and receiving a signal on the corresponding lines. The problem is that low speed wires 94 and 65, may not have compatible parameters needed for construction of a twisted pair with 250 Mbps as in GbE.

Accordingly, to implement the GbE, the adapter 91 maps the GbE outputs and inputs to and from the preexisting wiring 93. For example, the GbE may perform channel bonding on lower speed data links to implement higher speeds necessary for GbE or may multiplex multiple GbE lines onto a single pre-existing high-speed link. However, in some preexisting platforms, the low speed wires, such as wires 94 and 95 may not have computable parameters needed for construction of twisted pair links. Accordingly, the methods described with respect to FIG. 6B may be applied to discover these parameters.

Figure 6B:
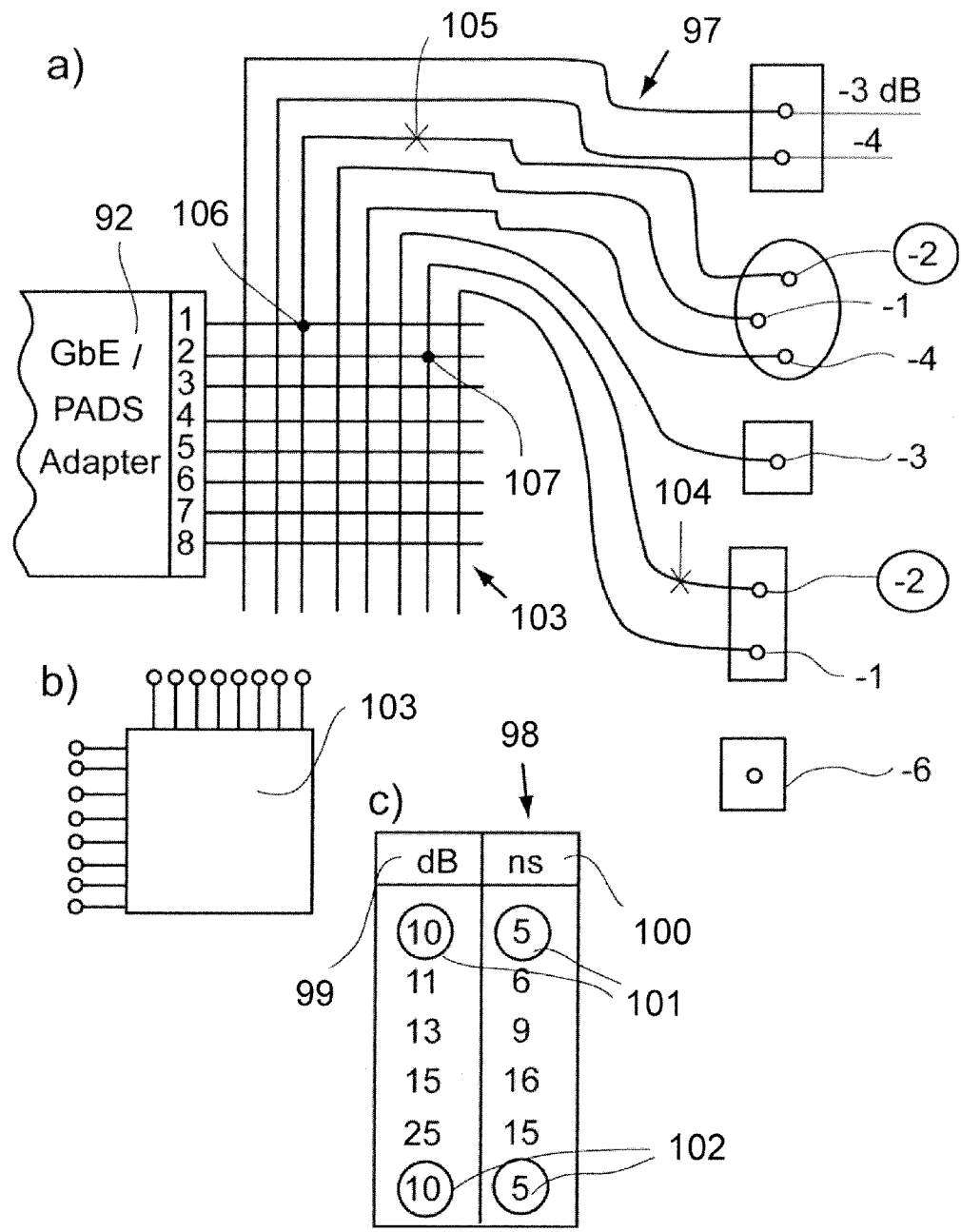

In FIG. 6B, a method of using a crossbar switch for reconfiguring a plurality of interconnects is illustrated. The interconnects 97 represent the platform's preexisting wiring. The adapter 92 controls the cross bar switch 103 to couple 106 different I/O ports to different elements of the preexisting wiring 97. These wiring maps may be implemented in the form of a look up table 98.

In some embodiments, the look up table 98 includes various line parameters 99, 100, such as attenuation, latency, bandwidth, segment length, bit error rate (BER), impedance, gauge, presence of shielding, presence of a twisted pair, the voltage standing wave ratio (VSWR), and other relevant line parameters. Here, for simplicity, we only discuss two such parameters: power loss 99 (in dB) and line latency 98 (in nanoseconds or ns) and only one parameter, power loss in FIG. 6B(a) (illustrated with a minus sign to indicate attenuation).

To generate the lookup table 98, the lines 97 are measured and parameterized. After measurement, compatible line parameters are identified, within some tolerance. For example, in table 98, line 101 is compatible with line 102 because the pair have similar parameters. These measurements correspond to specific lines in the preexisting platform 97. For example, the compatible pair 101 and 102 may correspond to lines 104 and 105. Each line pair may serve as a virtual twisted pair, allowing use of the pair in creation of a "virtual" high-speed interface. For instance, in the GbE example, if four such pairs are identified, then the four required 250 Mb/s links may be implemented using the pairs.

The adapter 92 will implement this link by coupling the corresponding I/O ports of the Ethernet interface to the lines 97. Similarly, other high-speed interfaces such as fiber channel may be realized.

In some embodiments, the GBE/PADS measurement and mapping process is done automatically, by API, or manually. In some cases, solutions to the mapping problem will not be found. In the case when a solution cannot be found, constraints may be reduced or eliminated. For example, physically replacing of some wires (including Tx/Rx) with other higher-speed ones, may be performed if space is available. This is an essence of any retrofittability process that the restricted solution may not be available. However, the above procedure, if automated, and using combinatories, can offer a mathematical proof that within given assumptions (or, constraints), the solution exists or not, during very short evaluation time; e.g., hours.

FIG. 6C illustrates a plurality of LRU modules integrated into a preexisting platform using adapters as described with respect to FIGS. 6A and 6B. In this example network, a TAWS module 111, a Map loader 112, and a mission controller 110 are in communication using high-speed interfaces 120, 121, and 119, respectively. These modules are integrated into a preexisting platform that does not provide support for these high-speed communication links. Accordingly, a plurality of adapters 114, 115, and 113 are used to adapt preexisting point-to-point links 116, 118, and 117 to support the high-speed interfaces 120, 121, and 119.

In platforms utilizing multiple embodiments of the invention, connectivity matrices may be generated to detail the communication path between modules. FIG. 6D illustrates a portion of one such matrix. In the interconnectivity matrix of FIG. 6 D, a flight data recorder (FDR) is coupled to a variety of other modules, such as a mission computer, a data acquisition unit, and a mission data loader through various network connections. Information about the connections, such as bandwidth, number of network segments in the link, segment length, attenuation, BER, impedance, wire guage, presence of shielding or twisted pairs, and VSWR are detailed in the matrix. Additionally, in some embodiments, multiple interconnections between each device are provided. For example, there may be multiple routes between the FDR and the DAU. In these cases, the adapter may be configured to switch connections to implement different routes in varying circumstances. For example, this may implemented to enable load balancing or healing of damaged connections.

Some embodiments of the invention utilize communication stacks modified from the traditional OSI Model. FIG. 7 illustrates such a modified communications stack 40. This communication stack may be used by modules, such as PADS modules described herein to provide authentication, security, and to control the links implemented out of preexisting wiring.

In some embodiments, the session layer 124 is modified 126 to provide an amorphous session layer 126. The amorphous session layer 126 provides the ability to authenticate and secure transmissions flowing externally to the platform. The amorphous Layer 5 protocol 126 includes session authentication and encryption facilities (normally found at OSI Layer 6 123) in order to provide additional information assurance (IA) to collected and/or generated flight data as well as sensing logic to determine what type of host platform exists outside the aircraft. Upon determination of the host platform, the amorphous session layer 126 controls the links used to implement the connection. For example, the amorphous session layer 126 may be configured to control the cross bar switch used in an adapter. Additionally, the amorphous session layer 126 may provide other functionality in relation to the adapter. For example, the amorphous session layer 126 may be provided with a list of possible links to create a session with, and may choose from the links to provide load balancing, or to implement a bypass if a link becomes damaged. For example, with respect to FIG. 6C, the session layer 126 on TAWS 111 may be configured to channel some data destined for the MC via the map adapter 115.

For communications within the platform, the MAC sublayer 125 is modified 128 to provide an amorphous MAC sublayer 126. The amorphous Layer 2 protocol 126 is under control of the amorphous session layer 126 and implements the required modifications to the data stream to accommodate the particular physical link corresponding to the adapter's connection 130 to the bus 131. In some embodiments, this includes sensing logic to determine the communications protocol being used at OSI Layer 1 to communicate 130 with the aircraft's native avionics bus 131. The amorphous MAC layer may further include control logic to packetize data in order to accommodate the communication protocol and link characteristics. Additionally, the MAC layer may be configured to allocate packets to different links based on the links capabilities. In some embodiments, these link capabilities may be determined from look up tables, for example, of the type illustrated in FIG. 6B. This link information may be provided by the session layer 126.

During the discovery stage, the platform's connectivity network, including its electrical interconnection topology, is evaluated. This may include determining the bandwidth, the maximum data rates, and the bit error rate of each connection in the platform's connectivity network. Each connection may be evaluated further for physical characteristics that may affect the eventual mapping of the PADS wiring to the platform. Such physical characteristics include connection impedance, length, gage of wire, etc. This evaluation may be performed using tools such as BERs, time reflectometers, multimeters, etc. to characterize the connections.

Figure 8:
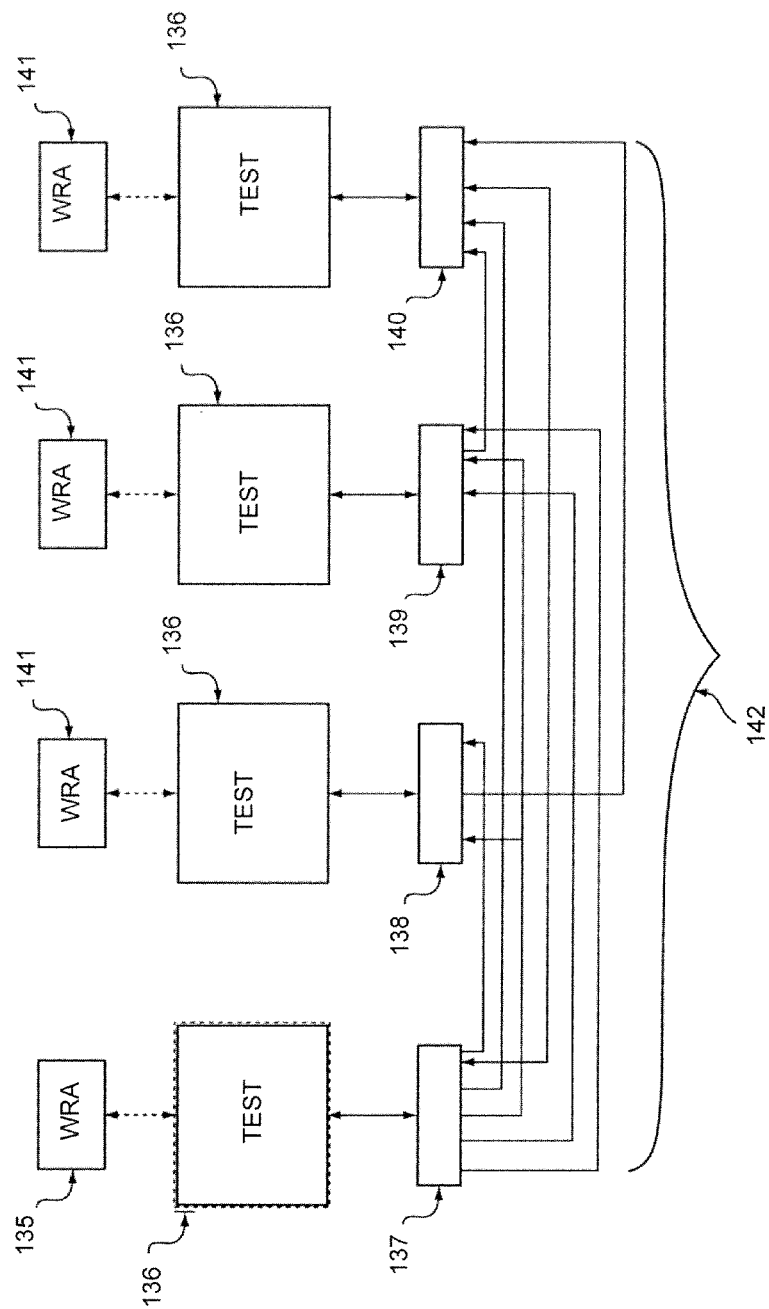
FIG. 8 illustrates a schematic diagram of a discovery stage and mapping stage implemented in accordance with an embodiment of the invention.

FIG. 8 illustrates a schematic diagram of a discovery stage and mapping stage implemented in accordance with an embodiment of the invention. In some embodiments, this mapping stage is performed once and then saved for future use. In other embodiments, the process can happen in a more dynamic manner, for example, if platform features are frequently changing.

In this embodiment, a new WRA 135 will be integrated into an existing platform 142. The connectivity of the new WRA 135 is mapped onto the existing connections 135 using a platform specific connection adaptor 137. Similar adaptors 138, 139, 140 are used for connecting the existing WRAs 141 to the platform network 142. To perform the discovery, test equipment 136 is coupled between the new WRA 135 and the platform 142 via the adaptor 137. Similar test equipment 136 is connected to the adapters 138, 139, 140 and their respective WRAs 141, to allow the full topology to be discovered. In some embodiments, the discovery measurement is a one-time event controlled by a PC with control software.

Once the platform connectivity is measured, a platform connectivity matrix may be produced. The platform connective matrix allows OFP on the WRA 135 to map the WRA connectivity to the platform 142. Existing wiring diagrams are incorporated into the matrix and updated with the measured data. In some embodiments, each of the connections is mapped including maximum data rate, maximum power level, impedance, length, number of sections (e.g. number of bulkhead connectors), number of wire discontinuities, attenuation per section, impedance, type of shielding, wire bundles (e.g. twisted pair or single wire). For example, an interconnectivity matrix of the type illustrated in FIG. 6D may be formed using this information.

Figure 9:
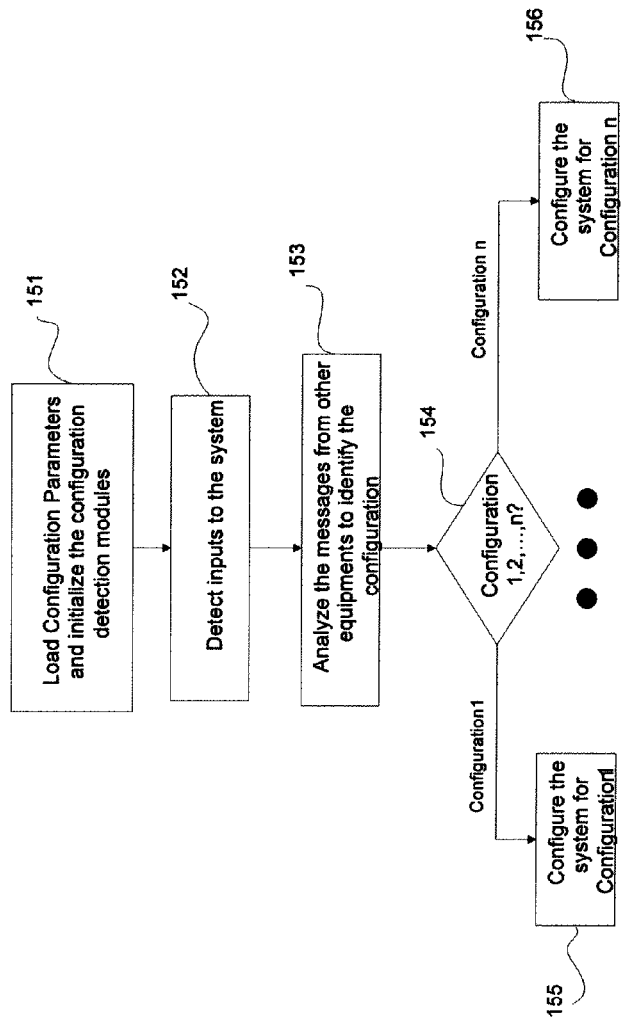
FIG. 9 illustrates an exemplary process flow for a software module executed by an operational flight program for configuring a PADS device to operate on a platform.

FIG. 9 illustrates an exemplary process flow for a software module executed by an operational flight program for configuring a PADS device to operate on a platform. With reference to FIG. 5, the OFP runs on the system processor 71, although the majority of the operations are dependent on the OFP specific modules 73. The process flow in FIG. 9 describes how the OFP intelligently chooses the configuration in various situations that the platform might have.

When the system is powered on, the OFP loads configuration parameters and then initializes the configuration detection modules 151. The configuration detection module then attempts to detect the input signals 152, such as analog, digital, or discrete inputs. Detected inputs then are used to form the internal database to adjust the OFP behavior in the current configuration. The straight inputs, such as analog and discrete signals, are put in the list of inputs, but the bus data (typically digital data) must be analyzed to understand the surrounding equipment configuration 153. The digital messages are analyzed to understand the configuration and then the configuration decision module will select the configuration to go to run mode 154. Then the system goes into normal operation mode with selected configuration 155 and 156.

Figure 10:
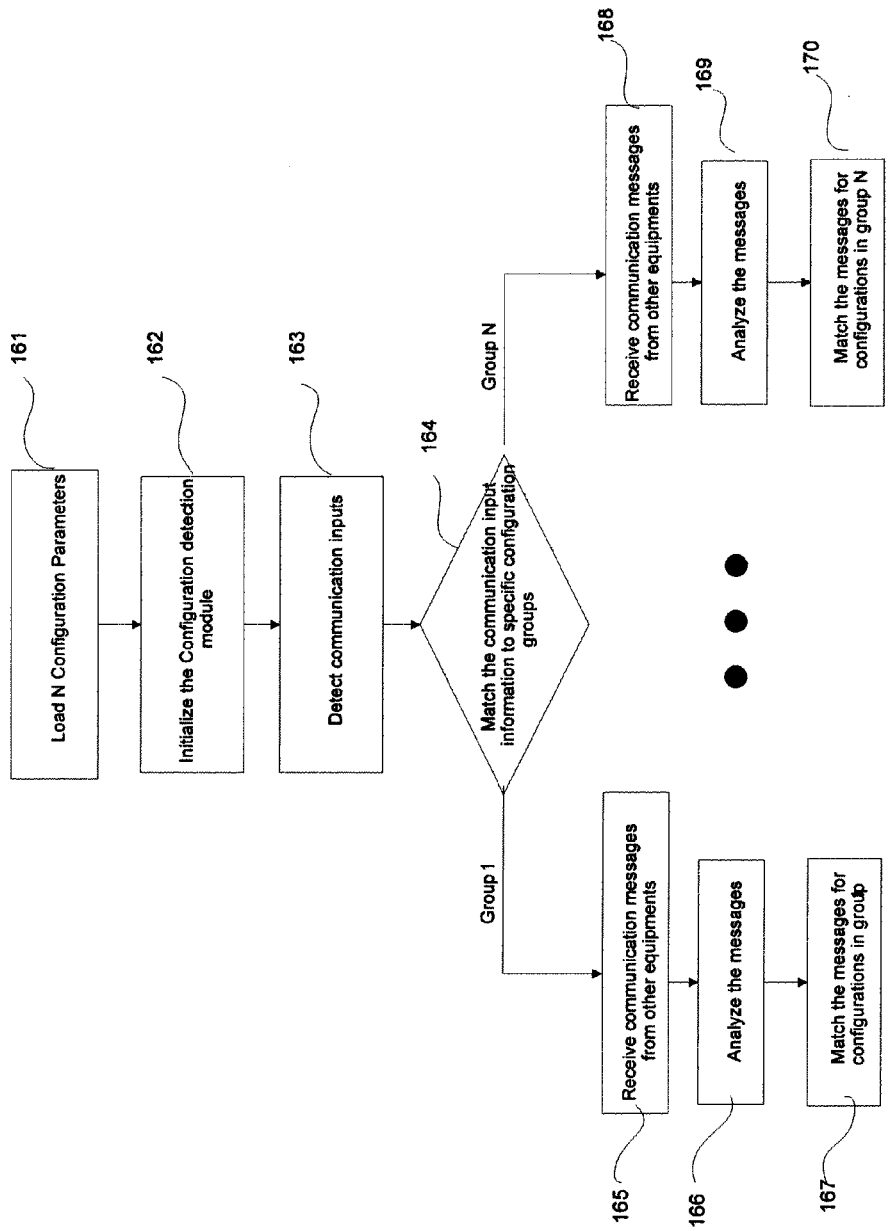
FIG. 10 illustrates a detailed process flow for operation of a detection module.

FIG. 10 illustrates a detailed process flow for operation of a detection module. The detection module loads all known configuration parameters in memory to be ready to detect the configuration 161. Using the loaded configuration parameters, the detection module is initialized to be in running mode 162. The configuration parameters are used to initialize the selection function, which will be thoroughly analyzed for optimal selection of configuration. The detection module then detects any communication inputs and attempts to communicate with other equipment to acknowledge the existence of the system 163. The detection module then matches the communication message patterns with the existing database (or configuration parameters) to decide which configuration will be used for runtime mode 164. Then the OFP initializes the communication routine to start communication with other equipment 165 and 168. The received messages are then analyzed 166 and 169 to decide which group of configurations will be used for runtime mode 167 and 170. The digital messages are used to select the group of configurations but then the other straight inputs (such as analog and discrete) will be used to further configure the OFP operation.

Figure 11:
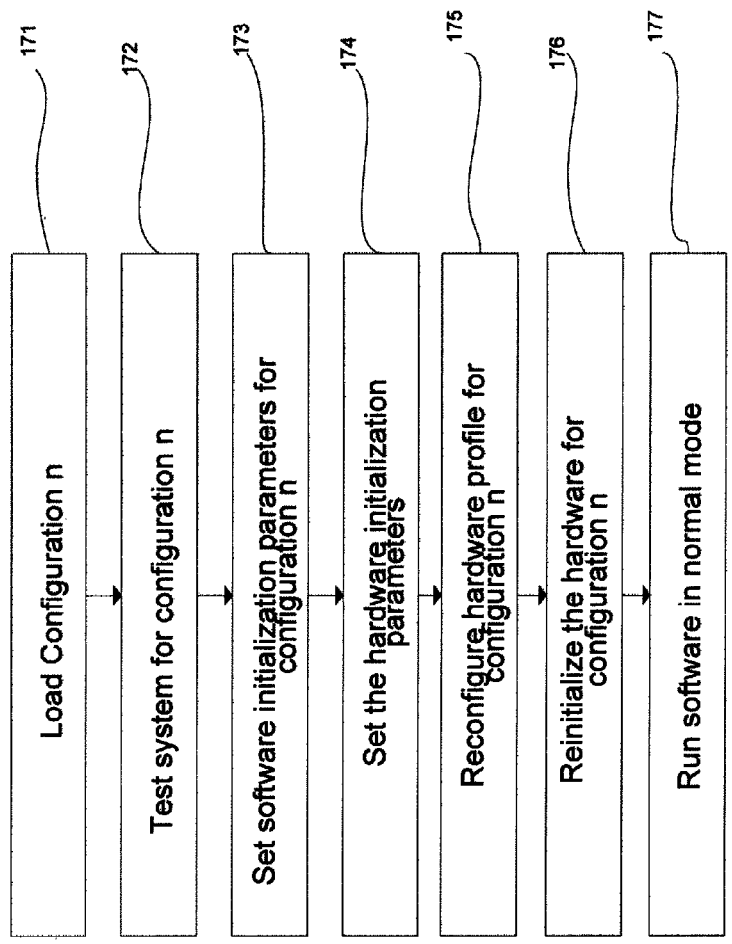
FIG. 11 illustrates the process flow of a configuration software module.

FIG. 11 illustrates the process flow of a configuration software module. This illustrated process is an example of an embodiment of the process step 123 of FIG. 10. When the configuration is selected according to the methods in FIGS. 9 and 10, the OFP needs to initialize the system to get into a normal operational mode. Based on the selection of configuration, the configuration module loads the configuration parameters to the system 171. The system needs to test the system to ensure that the selected configuration is adequate 172, which is typically needed for safety critical or system operation critical applications. The OFP then sets the software initialization parameters, such as memory, static variables, dynamic variables, and sub-module memory space 173. The initialization process is mainly to allocate the proper memory space for the runtime operations. Then the OFP attempts to set the hardware initialization parameters 174 and be ready to put the hardware objects in the OFP. The hardware will be then reinitialized based on the configuration 175 and at this time the hardware objects will be ready to be tested and to be inserted in the OFP configuration specific hardware objects. The OFP initializes the hardware objects and puts the status into the system 176. The operation-specific hardware peripherals will be all initialized at this time. Finally, the OFP goes into normal operational mode 177.

Figure 12:
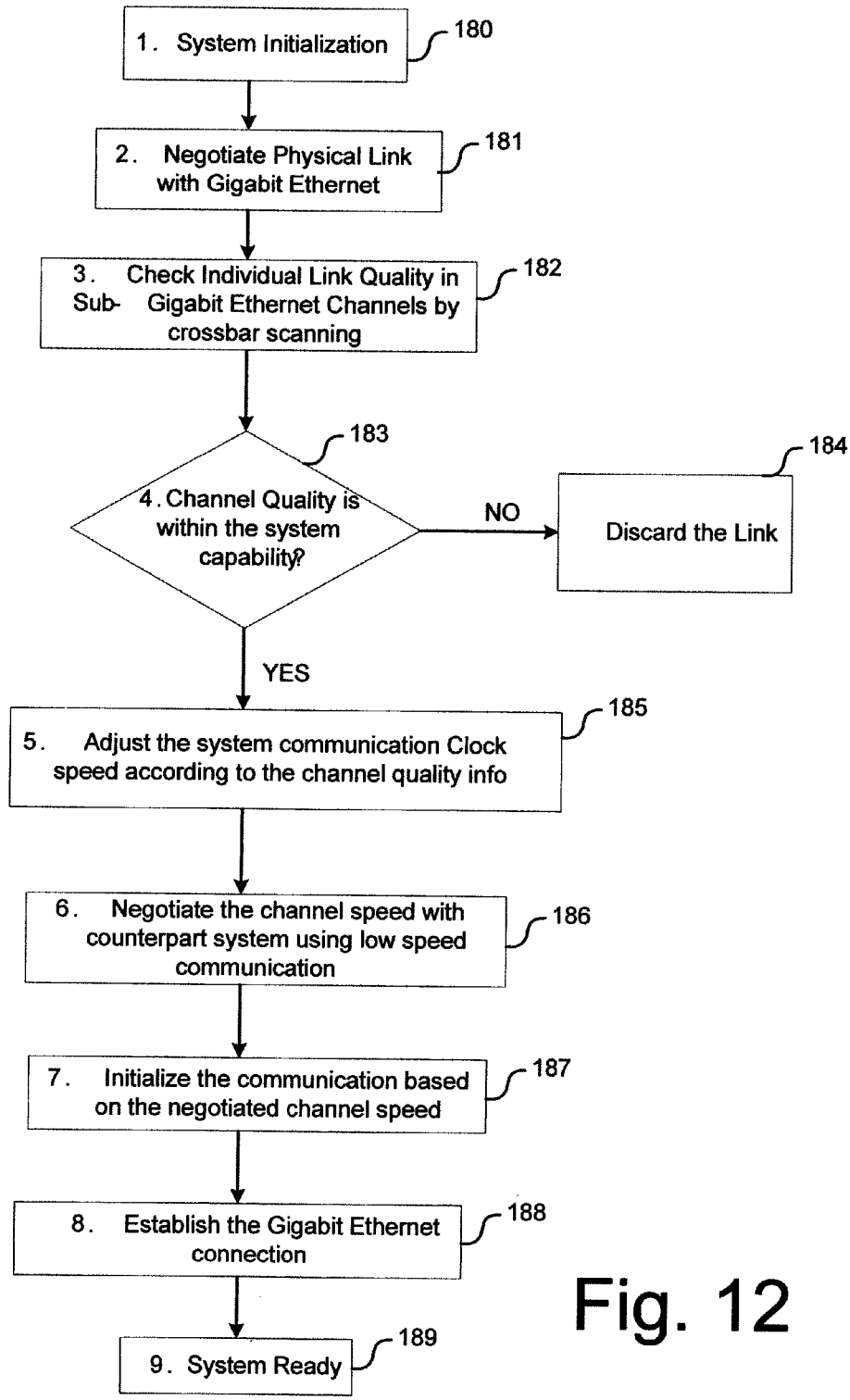
FIG. 12 illustrates a process of establishing a higher-speed data channel using a plurality of lower speed channels according to an embodiment of the invention.

FIG. 12 illustrates a process of establishing a higher-speed data channel using a plurality of lower speed channels according to an embodiment of the invention. This illustrated process is an example of an embodiment of the process step 123 of FIG. 10. In this embodiment, the higher-speed data channel is a GbE channel, but other connection types may be employed in other embodiments. In this embodiment, a crossbar switch is used to build a channel up from low speed wires present in a preexisting platform. The crossbar switch may be use to route wires in the interface to route the adapter's wires according to a particular platform, to accommodate for aspects such as channel strength, attenuation, and latency and to modify parameters such as clock skew.

In step 180, the system is initialized. The system is powered up and ready to start initialization process. Translator electronics check the system status and ready for crossbar establishment processes.

In step 181, the system negotiates the physical link with a host GbE device. The system sets up to communicate at the required physical link speed at a gigabit per second. The system will disconnect the link while the physical connection is tested for its capability.

In step 182, the system checks the crossbar switch for connections and builds a database of available links for communication candidates. At this time, the connected links are individually checked for cable quality with respect to its attenuation level. This process determines how much data the channel can handle and sets the channel speed at a safe level. Both ends of the system may have different link speeds determined so the least channel speed is used.

In step 183, the channel quality of each available link is evaluated to determine if the link has sufficient channel quality. Some embodiments utilize a variable system clock that can operate in a range of clock frequencies. Since the variable system clock has the limit in ranges, the channel must be checked to see if the channel quality is within the system capability. If the channel speed is out of range then the link will be removed from database 184. In embodiments where different system ends have different link speeds and quality parameters, only the lower bound will be checked for rejection.

In step 185, the communication clock for each link will be adjusted to be ready for communication link setup according to the detected signal quality. In step 186, the paired system negotiates and sets the link speed for each channel using a low-speed communication, e.g. 19 kbps speed. Again, the link speed set will be determined based on the lower bound of speeds for the pair.

In step 187, the communication link is initialized based on the negotiated channel speed. In step 188, the GbE link is up and renegotiates the connection speed with the host. Accordingly, in step 186, the system is ready for communication.

Figure 13A:
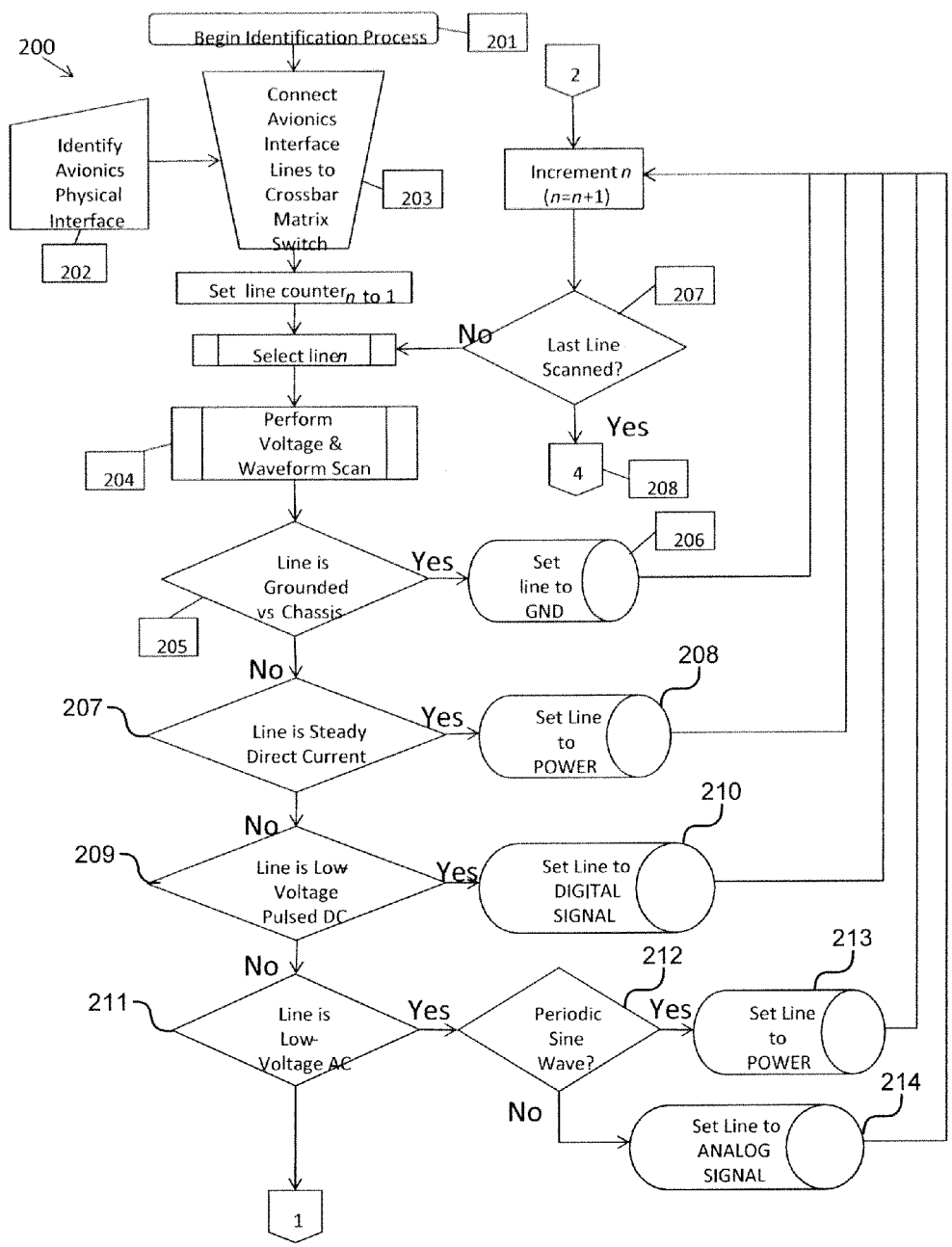
FIGS. 13A-C illustrate a process of platform discovery on an unknown platform.
Figure 13B:
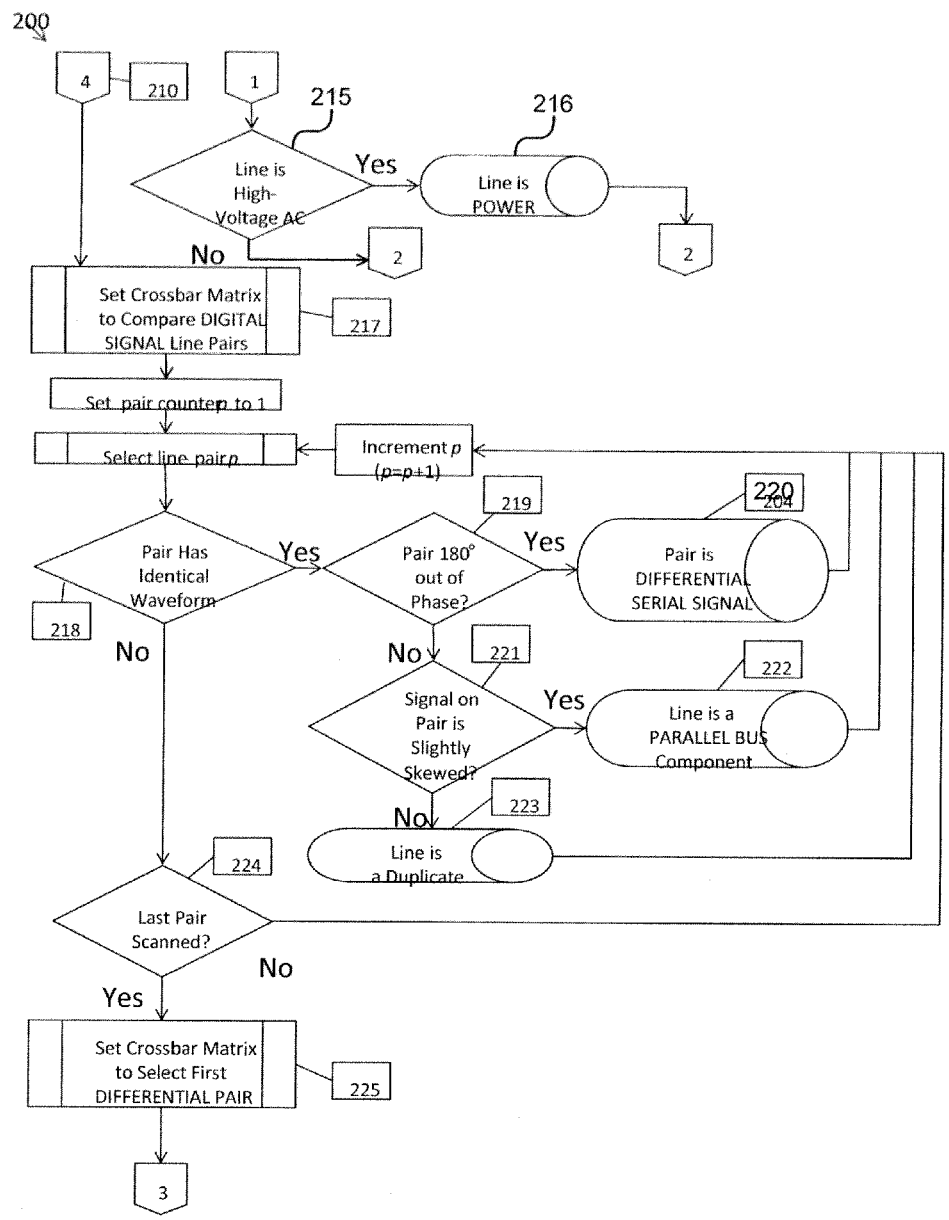
Figure 13C:
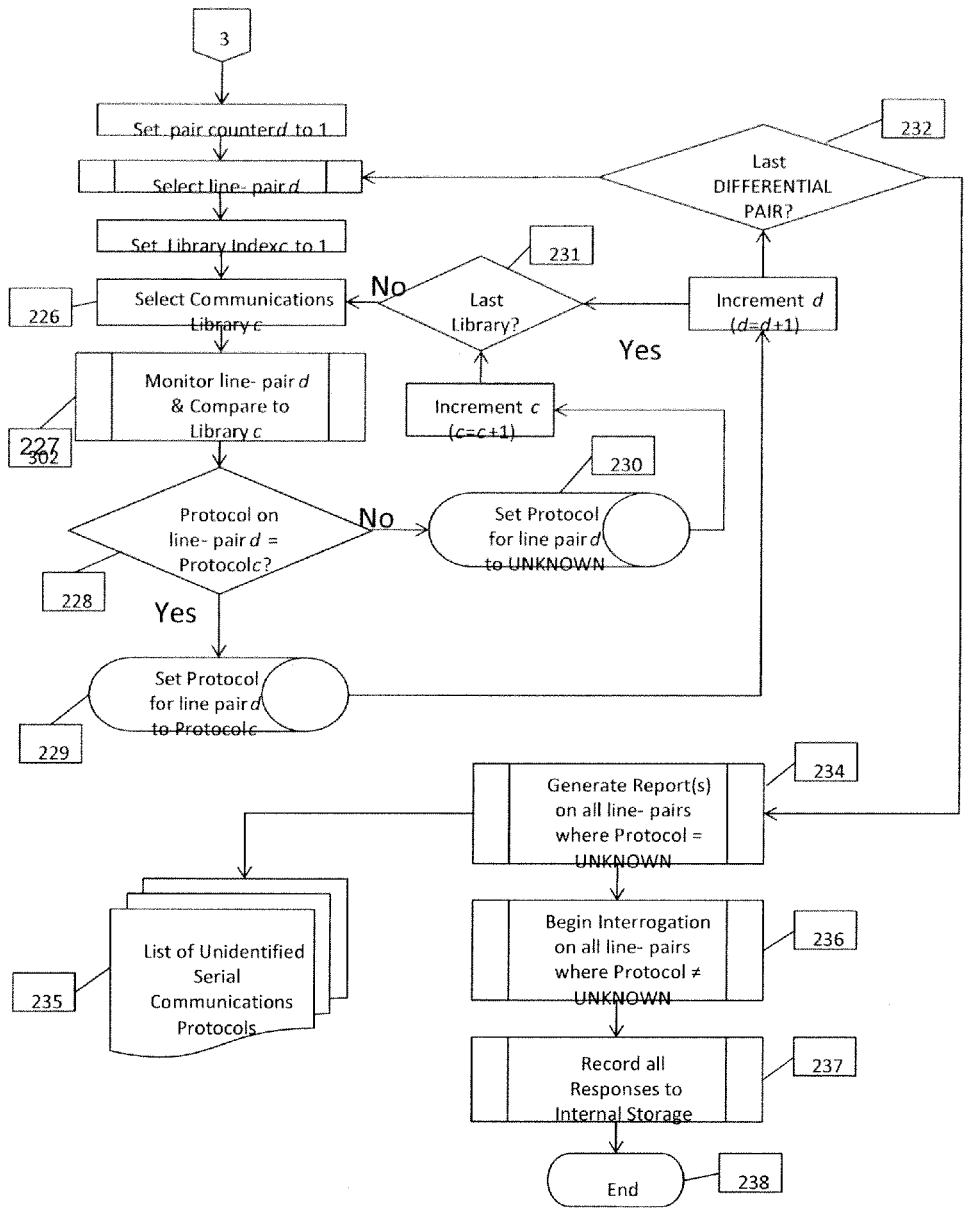

In some cases, a PADS device may need to be installed into a previously unknown platform. For example, an unknown avionics bus, such as that encountered in a downed or captured enemy aircraft, in order that its data may be downloaded or mission data loaded into the aircraft's systems. Some embodiments of the invention include discovery processes to "scan" or "sniff" the avionics bus at OSI Layers 1 and 2 at a minimum, and possibly at higher layers (i.e., OSI Layer 3 and above). FIGS. 13A-C Illustrate such a process. The crossbar switches used to adapt interfaces to a preexisting wiring system may be used to perform these scanning processes.

In this embodiment, the process begins 201 with a manual operation 202 of connecting the conductors of unknown function found at the avionics bus connector terminals to a crossbar matrix switch 203, a type of "scan/sniff" port. Once connected to the crossbar matrix switch, the unidentified electrical conductors of the unknown avionics bus can be probed, one at a time. Once the first line is (arbitrarily) chosen by the crossbar matrix switch, it is routed to a voltage and waveform scanner (a type of automated oscilloscope) and a voltage and waveform scan 204 is performed.

In step 205, the line's potential is compared to that of chassis ground. If it is found to be electrically connected to chassis ground a memory location in the scanner is set to "GND" 106, representing that the line is "grounded", and the line counter in the crossbar matrix switch is incremented. If the line is not grounded, then in step 207, the scanner determines if the line is steady-state direct current. If so, the line's memory location is set to power 208 and the counter is incremented. If not, then in step 209 the line is scanned to determine if it is a voltage pulsed DC line. If so, then the line is set to a digital signal line 210 and the counter is incremented. If not, then line is scanned to see if it is low voltage AC 211. If so, then the waveform of the line is scanned 212. If the scan shows the line has a periodic sine wave, then the line is set to power 213. If the scan shows the line does not have a periodic sine wave, then the line is set to an analog signal 214.

If the line is not low voltage AC, then the line is scanned to determine if it is a high voltage AC line 215. If so, the line is set to power 216 and the counter incremented. If not, then the system cycles through other possible line characteristics or proceeds to the next line.

Once the last line is connected 207 to the matrix, the process ends and program flow continues 208 to the next identification stage. Until then, the next line is selected and a new voltage and waveform scan 204 is performed. This process continues until all lines are scanned 207, and program flow transfers to the next identification stage 208.

In the next identification stage, the crossbar matrix is set to probe the (now partially) unknown avionics bus conductors in pairs 217, so as to determine the relationship of the signal lines to one another. The status of some conductors, such as power lines, was determined in the previous step (FIG. 13A).

In step 202, the selected pair is investigated to see if the pair has an identical waveform. If yes, then in step 219 the pair is evaluated to see if the signal on the pair is 180° out of phase. If so, then the line is labeled a differential serial signal pair 220, and the pair is incremented. If not, then the signal is investigated to determine if the relative phase of the signal on the pair is slightly skewed with respect to each other. If so, then line is labeled a parallel bus component 222, and the pair is incremented. If not, the lines are duplicates of each other, and the pair is incremented. If it was the last pair 224, program flow transfers to the protocol analysis stage by analyzing the digital protocol found on the serial differential signaling pairs 225 (if there were any found).

To begin the differential signal pair analysis, a communications library is loaded from the scanner's storage into its memory 226 and the first differential line pair is probed 227. If the protocol matches 228, then the scanner records that fact in its memory 229. If it doesn't find a match, the pair is set temporarily in the scanner's memory to "unknown" status. The process continues until the last library is reached 231, at which time the pair has been either assigned to a recognized protocol, or it is permanently assigned to "unknown" status 230. The scanner then probes the next differential signal pair until the last pair is reached 232, assigning the appropriate status to each pair (either 229 or 230). Program flow then continues on to the report generation stage 234 wherein the location (i.e. conductor number) of all unidentified signals is reported 235 to avionics engineers for further manual analysis. All successfully identified line pairs are then interrogated 236 and the responses recorded 237 for further analysis. At the conclusion of a recording session, the program ends 238. In some embodiments, the line pair with known protocols may be used as available links to map a PADS device's connectivity to the now at least partially identified platform.

Figure 14:
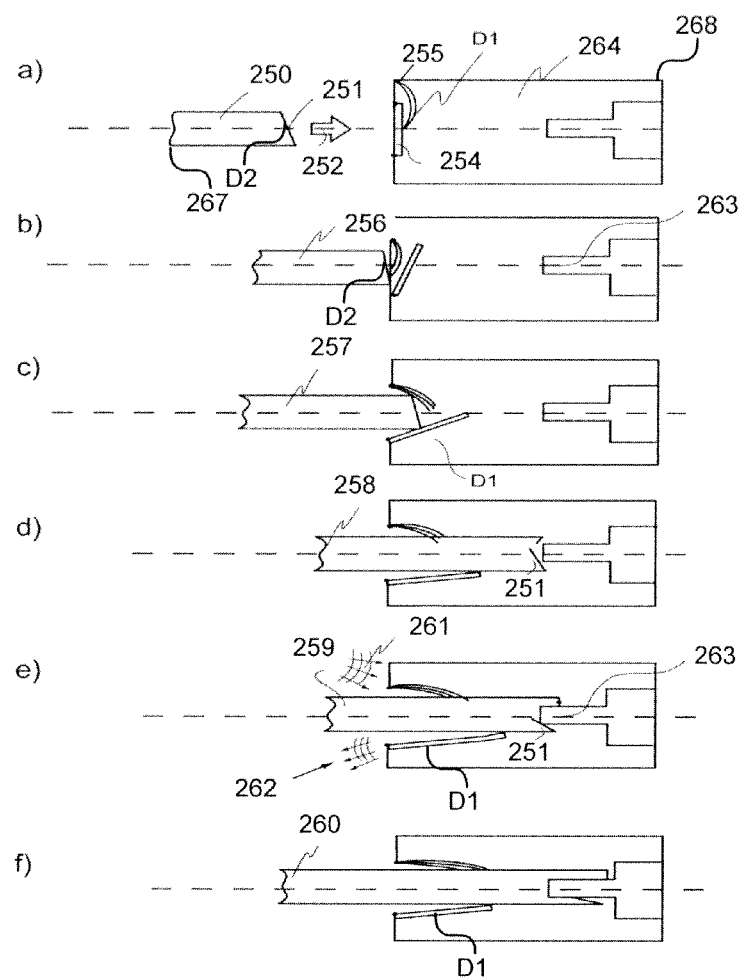
FIG. 14 illustrates an environmentally sealed RMU and an mating procedure for insertion of an RMU into an RMU bay disposed in a PADS device.

As described above, some embodiments of the invention utilize RMUs. FIG. 14 illustrates an environmentally sealed RMU and a mating procedure for insertion of an RMU into an RMU bay disposed in a PADS device. In the illustration, the mating side connector part 250 with door, D2, 251 moves from left to right 252 in order to meet the connector part 263. The second connector 264 includes a second door, D1, 254 and an RF blocking curtain 255. The same connector parts are shown in FIGS. 13a, b, c, d, e, f, with the connector 250 in various positions: 256, 257, 258, 259, 260. The RF curtain 255 is coupled to the RMU bay housing proximal to door 254 and blocks Line of Sight (LoS) transmissions for incoming 261, or outgoing 262 RF radiation. Such RF radiation could provide RF interference (RFI) 261 or 262 with electrical components 263. In particular, the radiation could interfere with the connection between the RMU and the RMU bay. Prevention of interference and preventing radiation leakage may be used to implement TEMPEST requirements in the system.

In particular embodiments, the RMU 250 has a conductive casing 267. The RMU bay 264 also has a conductive casing 268, providing a Faraday cage. The RF blocking curtain 255 contacts the casing as the RMU 250 is inserted into the RMU bay 264 (256-260), preventing leakage from the Faraday cage that would otherwise occur when door, D1, 254 is opened.

When the door, D2, in the RMU 251 is open, as in FIG. 14(d), for example, the RF curtain 255 blocks incoming RF radiation 261. In some embodiments, the RF curtain 255 may comprise a metallic material, or other radio-opaque material. For example, the RF curtain 255 may comprise layers of metal wires forming radiopaque barrier, a membrane, or woven metal cloth. The door 251, D2, allows connector part 253 to penetrate the mating part 250, as in FIG. 14(e), for example, while protecting 259 from harsh environmental exposure. In some embodiments, the curtain 255 provides additional protection to the interior of the bay 253 from a harsh environment. In FIG. 14(f), the finalization of RMU connector mating process is shown FIGS. 15A-15D illustrate a particular embodiment of an RMU and RMU mating bay implemented in accordance with an embodiment of the invention. The RMU 330 comprises a housing 331, a door, D2, 332, and a pair of pins 33 on either side of the door 332. In the illustrated embodiment, the pins 33 are proximal to an axis of rotation of the door 332. Enclosed within the housing 330 are one or more memory units 334. In the illustrated embodiment, the housing 330 contains a plurality of memory units in a stacked configuration.

The RMU bay 335 comprises a housing 335, door, D1, 339, electronics components 336, memory unit receptacle 338 and pin receptacles 337. In some embodiments, the electronics components 336 may include various functional supersurrogate modules to allow the RMU bay 335 to function as a WRA. For example, the RMU bay may comprise a map loader, a TAWS, or a data recording unit.

Figure 15A:
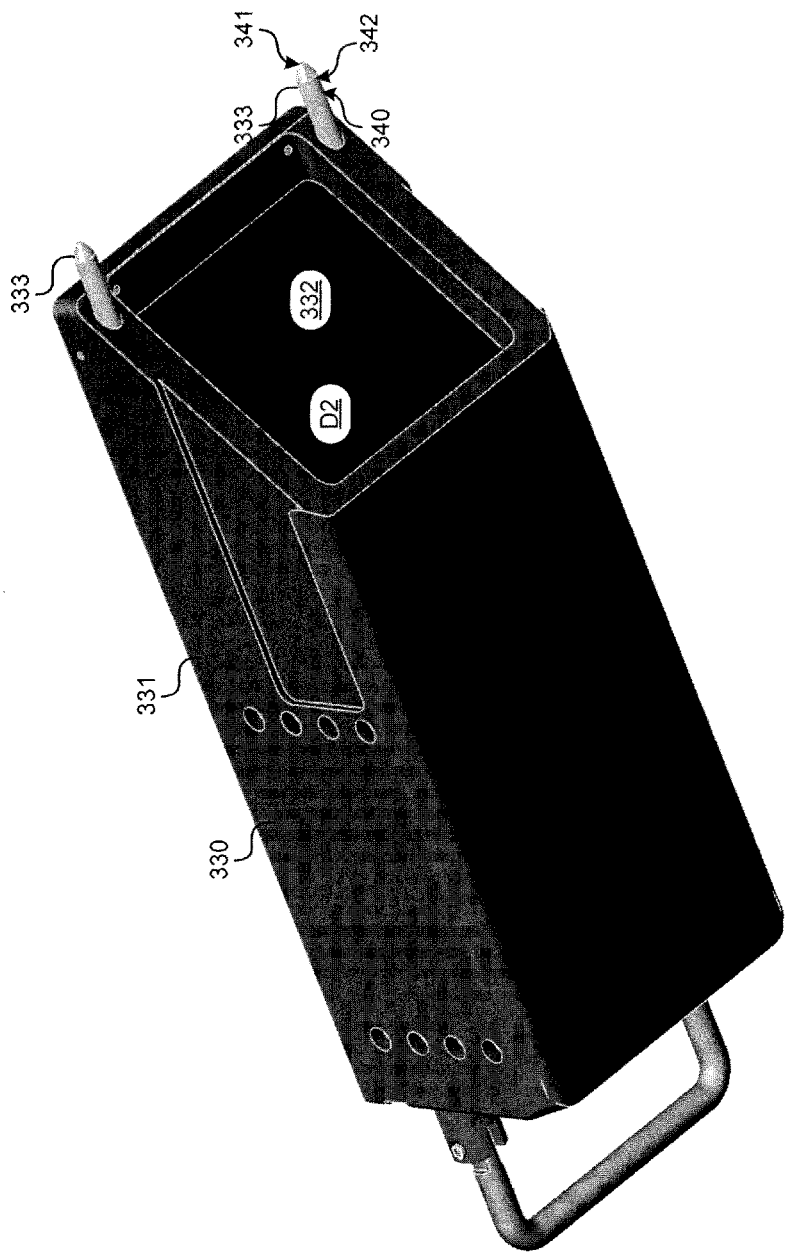
FIGS. 15A-15D illustrate a particular embodiment of an RMU and RMU mating bay implemented in accordance with an embodiment of the invention.
Figure 15B:
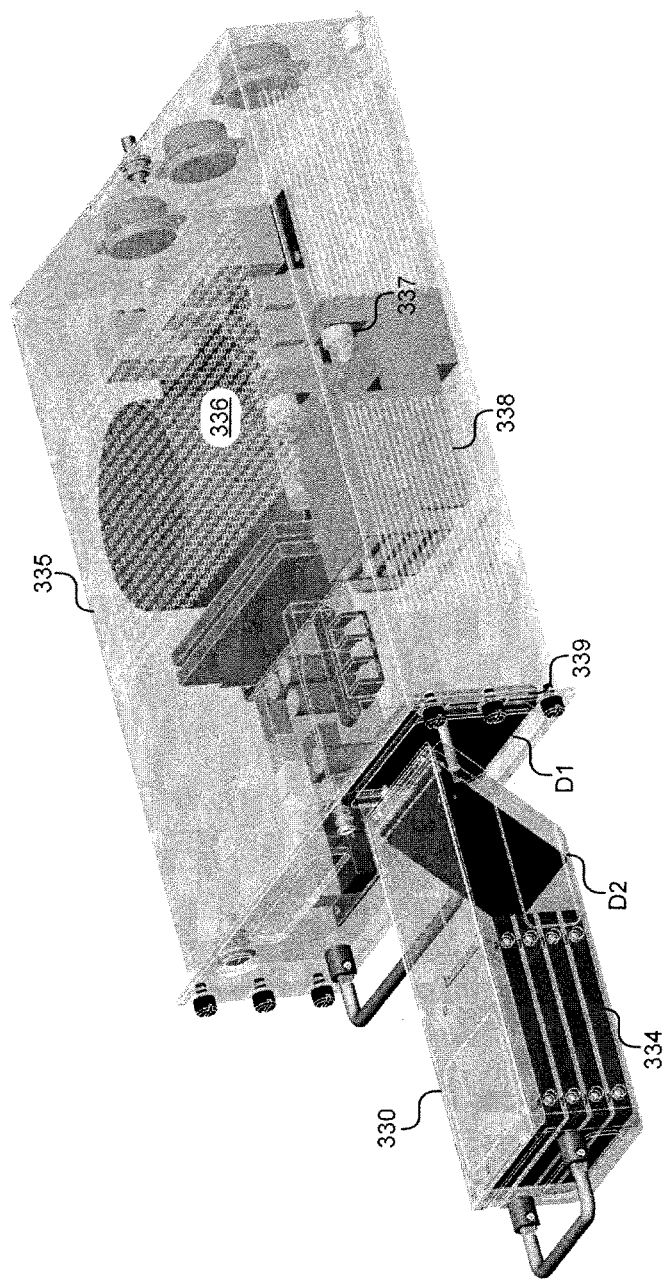
Figure 15C:
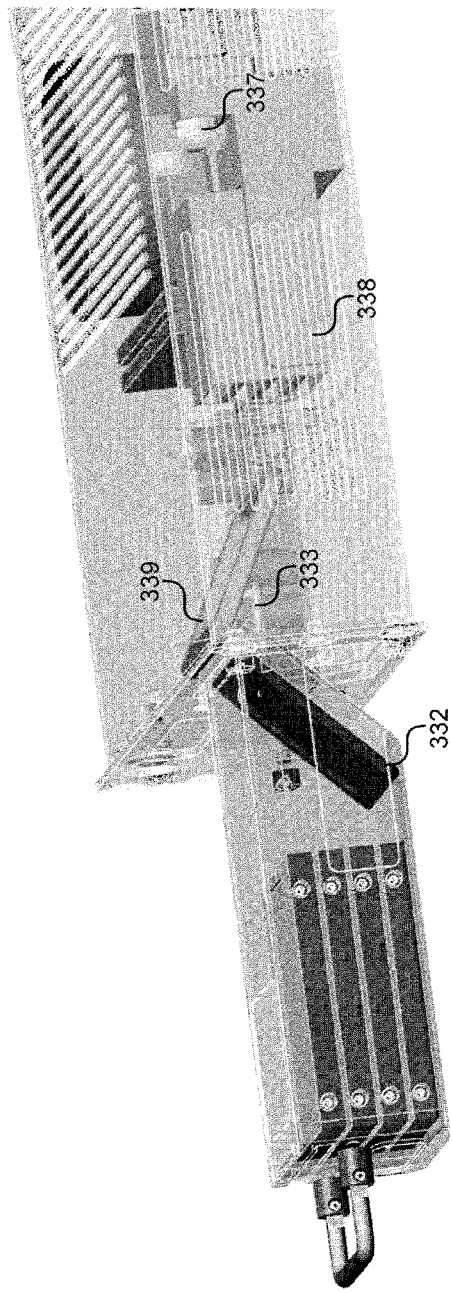
Figure 15D:
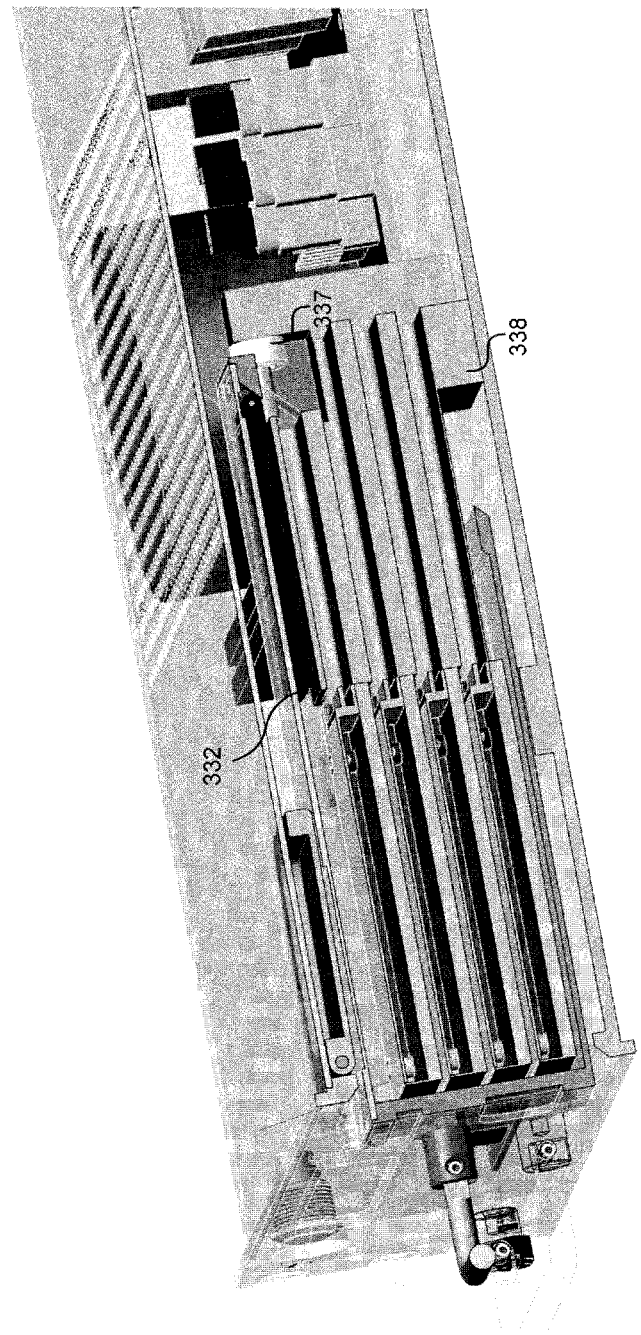

The RMU 330 is mated to the super-surrogate avionics unit 335 in one step during a 3-Phase process illustrated in FIGS. 15B-15D. This mating is accomplished by taking the RMU 330 in its unmated state and manually pushing it into the super-surrogate's RMU-bay door 339 such that the power/data connector plug 338 supported by the super-surrogate's base structure 335 and located behind door 339 is uncovered (FIG. 15C). Further pushing the RMU 330 into the super-surrogate 335 leads to said receptacle pushing open the environmental and EMI/RFI/ESD-shielding door on the RMU 332 (FIG. 15D). Continuing to push the RMU through the opening created by super-surrogate's RMU-bay door leads to the engagement of the self-aligning pins 333 on the RMU 332 unit-side and the self-aligning socket 337 on the supersurrogate-side (FIG. 15D), effectively "mating" the RMU 330 with the super-surrogate 335. Self-alignment, one aspect of the present invention, is accomplished by a combination of the specific form-factors of the pin 333 and socket 337, along with a prescribed amount of mechanical float provided by the pins 333. In other embodiments, the locations of the pins and the socket may be reversed, with the sockets in the RMU 330 and the pin disposed adjacent to the supersurrogate-side.

As illustrated, in some embodiments, each pin comprises a substantially cylindrical portion 340 and a tapering portion 341. The pin may also comprise a lip portion 342 distal from the tapering portion 341. In the illustrated embodiment, the pin receptacle 337 comprises a substantially cylindrical hollow portion. The substantially cylindrical hollow portion is spaced to allow the substantially cylindrical portions 340 of pins 333 to fit within. In some embodiments, the hollow and the cylindrical portions 340 may have substantially the same diameter, so that the pieces fit together with a friction fit. In other embodiments, the diameter of the hollow portion may be greater than the diameter of the cylindrical portion 340 to provide a predetermined amount of play. The tapering portion 341 allows slight misalignments of the connectors to be corrected during insertion. Additionally, during insertion, when the connectors are slightly misaligned, the lip portion 342 interfaces with the pin receptacle 337 to allow the pin 333 to be displaced. The displacement of the pin 333, results in a corresponding displacement of the connector, allowing the electrical contacts in the connector 334 to electrically connect to corresponding electrical contacts on the second connector 338.

In prior art systems, the mechanical mating of electrical connectors must typically be visually or manually verified. The embodiment of the invention illustrated in FIG. 16A-D provides a method for electronically verifying proper mechanical mating of electrical connectors, eliminating the need for visual or manual verification. In this embodiment, a positive connection monitoring system 400 for the novel avionics bay electromechanical connectors described elsewhere in this invention utilizes a miniature piezoelectric sensor 401, such as the Model 7502 A, available from Measurement Specialties of Hampton, Va., in order to sense the unique vibration signal, i.e., mechanical "clicking" sound emanating from the interface region 405, of said connector halves (i.e, the male half 402 and the female half 403) when they are positively engaged. Prior art connection verification systems can tell when a "solid" electrical connection has been made between two electrical conductors 404 406, but not when a "solid" mechanical connection of their surrounding support and protective housings has been made. This aspect of the present invention provides automated, machine-readable positive feedback when the two connector halves have been securely mated.

Figure 16A:
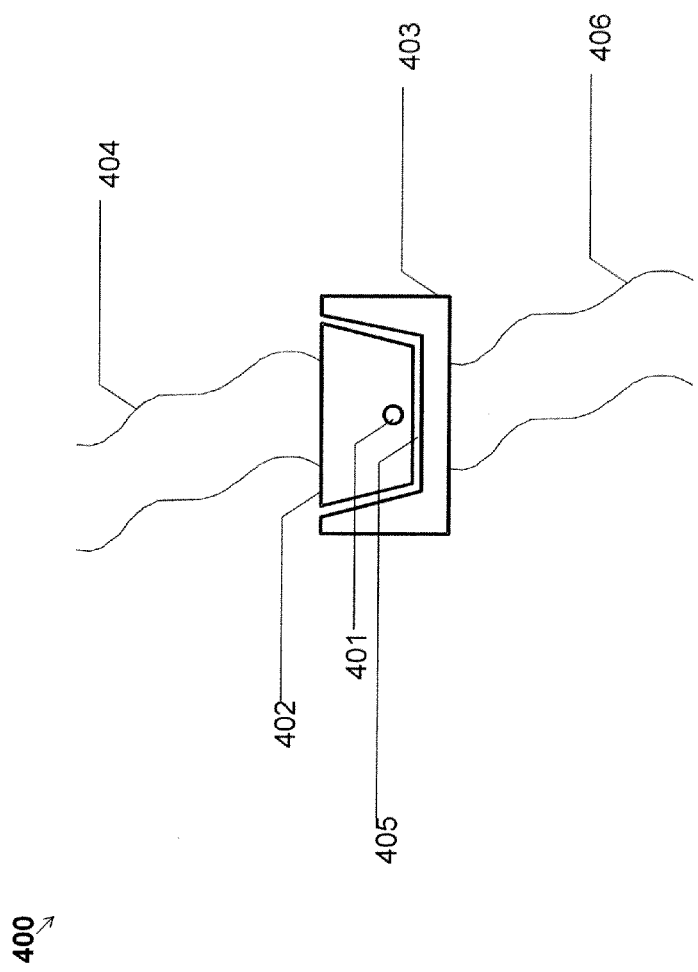
Figure 16C:
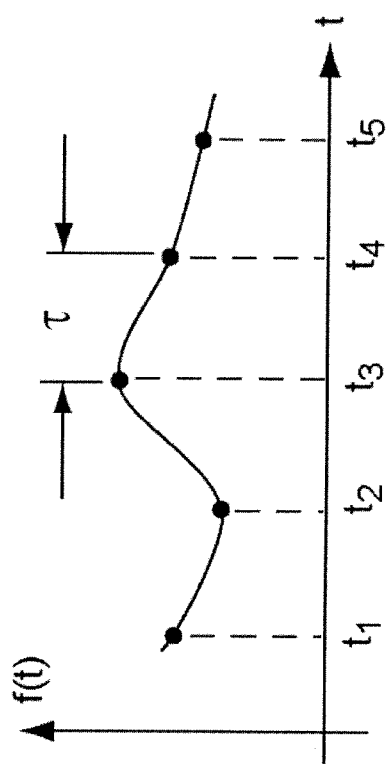

Some embodiments of the invention utilize measurement of a vibration signal due to longitudinal or transversal sound (vibration) waves. These vibrational waves are created when the connectors physically mate, creating a unique "click event." As illustrated in FIG. 16B, the click event produces vibration signal with amplitude, V, centered around central frequency, $f_o$, or angular frequency, $\omega_o$, where $\omega_o=2\pi f_o$. In some particular cases, it can be centered around a number of such frequencies. For sake of explanation, only the single frequency, $f_o$ case is considered. Such a signal has a slowly varying amplitude, A(t), also called an envelope, presented in the form of an analytic signal:

$$V(t)=A(t)\exp(j2\pi f_o \cdot t) \quad (12\text{-}1)$$

where t is time variable and $j=\sqrt{-1}$. The Fourier transform of such signal: $\hat{V}(f')$, in shifted frequency: $f'=f-f_o$, is $$\hat{V}(f') = \int_{-\infty}^{+\infty} A(t)\exp(-j2\pi f' t)\, dt \quad (12\text{-}2)$$

which is illustrated in FIG. 16B, where both frequencies f and f' are shown. The spectral bandwidth, $\Delta f$, of this signal is inversely proportional to the sampling constant, $\tau$, of the signal envelope. The sampling constant is the shortest distance between discrete time coordinates, such that a smooth curve can be produced between them without adding any additional information, as shown in FIG. 16C, where the following relations exists:

$$\tau = \frac{1}{\Delta f};\ f_o = \frac{1}{T} \quad (12\text{-}3)$$

where T is a period.

Figure 16D:
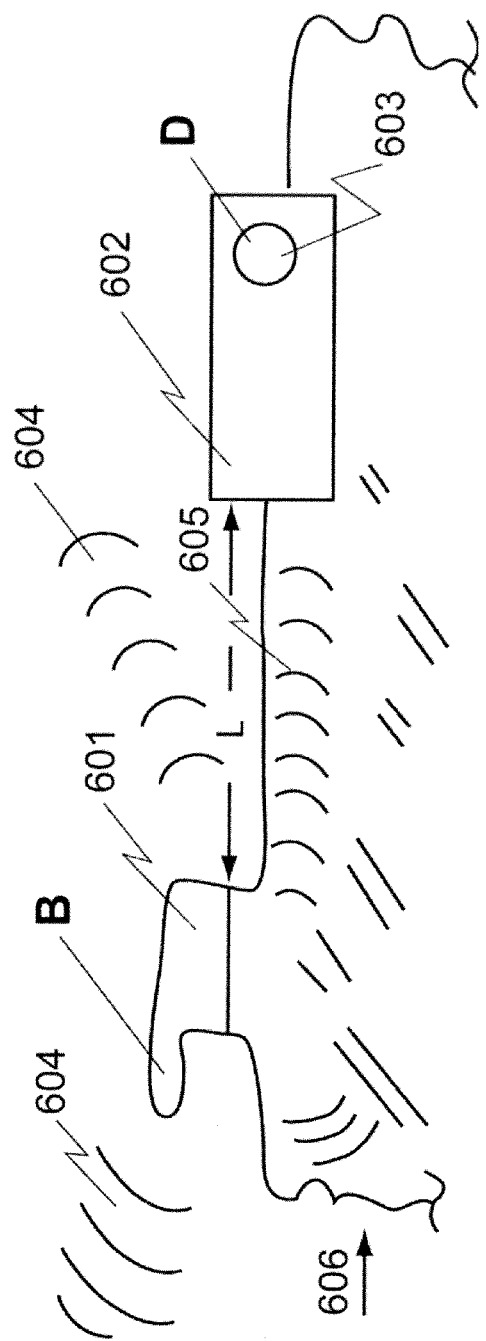

FIG. 16D illustrates the creation of a click-event sound signal when a connector is coupled to a connector receptacle. Such a sound signal, V(t), is produced by a "click" event source 604, B, transmitted through a medium 605, with attenuation coefficient, $\beta$, and then recorded by the vibration sensor 603, D, which can be embedded in a given connector circuitry. Typical distances, L, between B and D are in the range of 10 cm, or less, so, assuming, conservatively, that a medium is steel, for example, $\beta=5\ m^{-1}$; thus, with L=10 cm, the sound amplitude is attenuated by small factor: $\exp(-0.5)=0.61$, and such a click-event-signal can be easily detected by vibration detector 603, D. For example, the vibration detector 603 may be a piezoelectric sensor 401 as illustrated in FIG. 16A.

As illustrated in FIG. 16D, the click-event-signal source, B, at location 601, transmits a sound signal, which propagates into the air 604, and through medium 606 into vibration sensor, D, at location 603, as wavefront 605, with attenuation, defined by attenuation coefficient, $\beta$. The vibration sensor, D, is located at connector circuitry 602. Then, when the click at location 601 occurs, the sensor D will be alerted relatively quickly, with latency $\Delta t$, in the form:

$$\Delta t = \frac{L}{V_t} \quad (12\text{-}4)$$

where L is distance between source, B, and sensor, D. Assuming, conservatively, the transversal speed, $V_t$, which is, usually, lower than longitudinal speed, $V_l$, we have for steel, $V_t=3,179\ ms^{-1}$. For example, for L=10 cm, from Eq. (12-4), $\Delta t=3\cdot 10^{-5}$ s=30 μsec, which is reasonably short latency to be alerted when a physical mating occurs.

In additional embodiments, further click events may be defined and monitored for. For example, a characteristic sound of a connector rattling may be monitored for to determine if the connector has come loose. As another example, the sound of a connector becoming uncoupled may be monitored for.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 17:
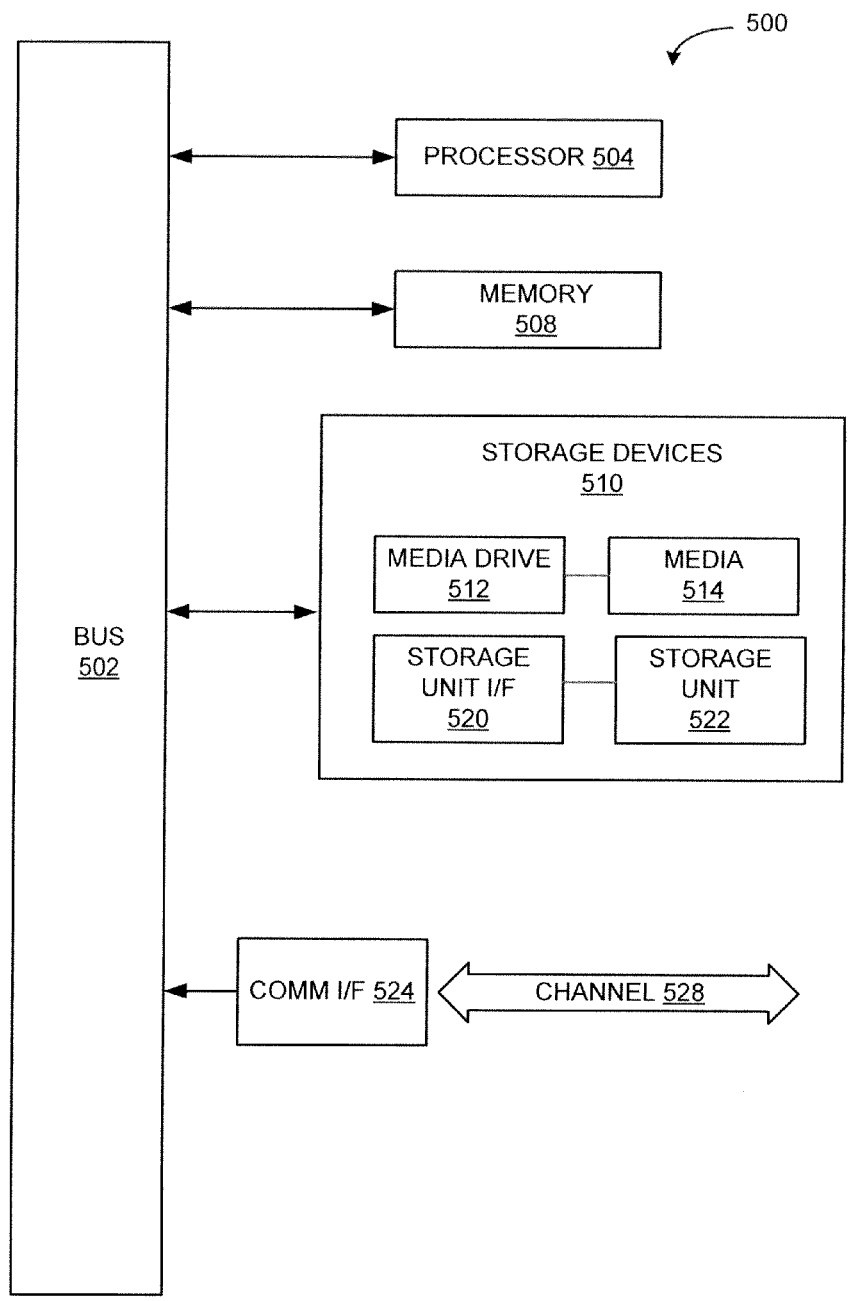
FIG. 17 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 17. Various embodiments are described in terms of this example—computing module 500. After reading this description, it will become apparent to a person skilled in the relevant art how to implement the invention using other computing modules or architectures.

Referring now to FIG. 17, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of adapting an existing on-the-move data transfer platform for use with a weapons replaceable assembly, the data transfer platform comprising a plurality of disparate interconnect lines in which one or more of the interconnect lines has line parameters different from others of the plurality of disparate interconnect lines, the method comprising:
    evaluating an electrical interconnection topology of the data transfer platform, the evaluating comprising measuring line parameters of each of the plurality of disparate interconnect lines to quantify a plurality of line parameters for each of the plurality of disparate interconnect lines;
    determining whether, based on the measured line parameters, a group of two or more interconnect lines from the plurality of interconnect lines are compatible and can be combined to form a physical layer interface that is different from a physical layer interface previously specified for the interconnect lines;
    obtaining a weapons replaceable assembly comprising a data connection, the data connection requiring a bandwidth greater than the bandwidth of any single available interconnect line of the plurality of interconnect lines; and
    mapping the data connection of the weapons replaceable assembly to the group of compatible interconnect lines to distribute the bandwidth of the data connection over the group of compatible interconnect lines thereby adapting the interconnection topology for use with the data connection of the weapons replaceable assembly.

2. The method of claim 1, further comprising:
    for each of a plurality of interconnecting communications platforms, each interconnecting platform comprising an electrical interconnection topology comprising a plurality of available interconnect lines:
        evaluating each electrical interconnection topology;
        mapping the data connection to each electrical interconnection topology;
        according to the mapping, generating a platform connectivity matrix for coupling the weapons replaceable assembly to each interconnecting communications platform.

3. The method of claim 1, wherein the step of measuring each of the plurality of interconnect lines to quantify a plurality of line parameters for each of the plurality of interconnect lines comprises:
    determining a maximum data rate for each available interconnect line of the plurality of interconnect lines; and
    determining a bit error rate for each available interconnect line.

4. The method of claim 3, wherein measuring each of the plurality of interconnect lines to quantify a plurality of line parameters for each of the plurality of interconnect lines further comprises determining a line loss for each available interconnect line.

5. The method of claim 3, wherein measuring each of the plurality of interconnect lines to quantify a plurality of line parameters for each of the plurality of interconnect lines further comprises determining a latency for each available interconnect line.

6. The method of claim 3, wherein the step of evaluating the electrical interconnection topology further comprises determining the impedance of the available interconnect line.

7. The method of claim 3, wherein measuring each of the plurality of interconnect lines to quantify a plurality of line parameters for each of the plurality of interconnect lines further comprises determining the length and gauge of a wire used in the available interconnect line.

8. The method of claim 1, further comprising according to the mapping, generating a platform connectivity matrix for a platform specific connection adapter to couple the weapons replaceable assembly to the communications platform.

9. The method of claim 1, wherein the mapping, comprises assigning the group of identified interconnect lines as a virtual channel.

10. The method of claim 1, further comprising entering the measured line parameters in a look up table, and wherein determining further comprises identifying compatible line parameters in the look up table across multiple interconnect lines.

11. The method of claim 1, wherein the weapons replaceable assembly comprises an assembly of modules selected from a supersurrogate set of modules.

12. The method of claim 8, wherein the step of generating a platform connectivity matrix comprises updating a wiring diagram of the electrical interconnection topology with the results of the step of evaluating the electrical interconnection topology.

13. The method of claim 8, further comprising, configuring a crossbar switch to couple the available interconnect lines to the data connection according to the platform connectivity matrix.

14. The method of claim 8, further comprising:
    generating an alternate mapping of the data connection to the interconnect lines; and
    incorporating the alternate mapping into the platform connectivity matrix.

15. A non-transitory computer readable medium having program code configured to cause a computer system to perform a method of adapting an existing on-the-move data transfer platform having a plurality of disparate interconnect lines, the method comprising the steps of:
    evaluating an electrical interconnection topology of the data transfer platform, the evaluating comprising measuring line parameters of each of the plurality of disparate interconnect lines to quantify a plurality of line parameters for each of the plurality of disparate interconnect lines;

determining whether, based on the measured line parameters, a group of two or more interconnect lines from the plurality of interconnect lines are compatible and can be combined to form a physical layer interface that is different from a physical layer interface previously specified for the interconnect lines;

obtaining a weapons replaceable assembly comprising a data connection, the data connection requiring a bandwidth greater than the bandwidth of any single available interconnect line of the plurality of interconnect lines; and mapping the data connection of the weapons replaceable assembly to the group of compatible interconnect lines to distribute the bandwidth of the data connection over the group of compatible interconnect lines thereby adapting the interconnection topology for use with the data connection of the weapons replaceable assembly.

16. The non-transitory computer readable medium of claim 15 further configured to cause the computer to perform the steps of:

for each of a plurality of interconnecting communications platforms, each interconnecting platform comprising an electrical interconnection topology comprising a plurality of available interconnect lines:
evaluating each electrical interconnection topology;
mapping the data connection to each electrical interconnection topology;
according to the mapping, generating a platform connectivity matrix for coupling the weapons replaceable assembly to each interconnecting communications platform.

17. The non-transitory computer readable medium of claim 15, wherein the step of measuring each of the plurality of interconnect lines to quantify a plurality of line parameters for each of the plurality of interconnect lines comprises:
determining a maximum data rate for each available interconnect line of the plurality of interconnect lines; and
determining a bit error rate for each available interconnect line.

18. The non-transitory computer readable medium of claim 17, wherein measuring each of the plurality of interconnect lines to quantify a plurality of line parameters for each of the plurality of interconnect lines further comprises determining a line loss for each available interconnect line.

19. The non-transitory computer readable medium of claim 17, wherein measuring each of the plurality of interconnect lines to quantify a plurality of line parameters for each of the plurality of interconnect lines further comprises determining a latency for each available interconnect line.

20. The non-transitory computer readable medium of claim 17, wherein the step of evaluating the electrical interconnection topology further comprises determining the impedance of the available interconnect line.

21. The non-transitory computer readable medium of claim 17, wherein measuring each of the plurality of interconnect lines to quantify a plurality of line parameters for each of the plurality of interconnect lines further comprises determining the length and gauge of a wire used in the available interconnect line.

22. The non-transitory computer readable medium of claim 15 further configured to cause the computer to perform the step of according to the mapping, generating a platform connectivity matrix for a platform specific connection adapter to couple the weapons replaceable assembly to the communications platform.

23. The non-transitory computer readable medium of claim 15, wherein the mapping, comprises assigning the group of identified interconnect lines as a virtual channel.

24. The non-transitory computer readable medium of claim 15, further comprising entering the measured line parameters in a look up table, and wherein determining further comprises identifying compatible line parameters in the look up table across multiple interconnect lines.

25. The non-transitory computer readable medium of claim 22, wherein the step of generating a platform connectivity matrix comprises updating a wiring diagram of the electrical interconnection topology with the results of the step of evaluating the electrical interconnection topology.

26. The non-transitory computer readable medium of claim 22, further configured to cause the computer to perform the step of configuring a crossbar switch to couple the available interconnect lines to the data connection according to the platform connectivity matrix.

27. The non-transitory computer readable medium of claim 22, further configured to cause the computer to perform the steps of: generating an alternate mapping of the data connection to the interconnect lines; and incorporating the alternate mapping into the platform connectivity matrix.

* * * * *